United States Patent [19]
Simmons

[11] Patent Number: 5,093,787
[45] Date of Patent: Mar. 3, 1992

[54] ELECTRONIC CHECKBOOK WITH AUTOMATIC RECONCILIATION

[76] Inventor: John C. Simmons, 7993 Cavershamwood, Memphis, Tenn. 38138

[21] Appl. No.: 564,653

[22] Filed: Aug. 6, 1990

Related U.S. Application Data

[63] Continuation of Ser. No. 872,971, Jun. 12, 1986, abandoned.

[51] Int. Cl.$^5$ .............................................. G06F 15/30
[52] U.S. Cl. ................................ 364/406; 364/705.02; 364/408; 235/379
[58] Field of Search .................... 364/705.02, 401, 406, 364/408; 235/379

[56] References Cited

U.S. PATENT DOCUMENTS

| | | | |
|---|---|---|---|
| 4,321,672 | 3/1982 | Braun et al. | 364/408 |
| 4,348,744 | 9/1982 | White | 364/900 |
| 4,650,981 | 3/1987 | Foletta | 235/449 |
| 4,724,527 | 2/1988 | Nishimura et al. | 364/705.02 |
| 4,737,911 | 4/1988 | Freeman | 364/406 |

OTHER PUBLICATIONS

Kroenke, D. M., *Database Processing: Fundamentals, Design, Implementation,* Second Edition, Science Research Associates, Inc., Chicago, 1983, 415–425.

Gorman, M. M., *Managing Database: Four Critical Factors,* QED Information Sciences, Inc., Wellesley, Mass., 1984, 34, 35, 112, 113, 172–179.

"Madison National to Intro Integrated Banking System", *Computer+Software News,* vol. 2, No. 42, Oct. 15, 1984, 14.

The Smart Checkbook Software Manual, version 2, Softquest, Inc., 1983.

"Smart Checkbook", Softquest Inc. (Rosenberg Associates), Nov. 1982.

Kane, J. J. et al., "Automating Check Reconcilement with a Microcomputer", *Journal of Cash Management,* vol. 5, No. 6, Nov./Dec. 1985, 80–83.

Magid, L. J., "Software Speeds Banking-at-Home with Checkbook-Balancing Function", *Washington Post,* Nov. 7, 1988, Business section, p. 30.

*Primary Examiner*—Clark A. Jablon

[57] ABSTRACT

An apparatus for reconciling checking account and other transaction data including first and second data reconciliation control units, each including associated memory, data transference/communication channels for facilitating two-way data communication between the first and second data reconciliation control units, data comparison circuitry, data discrepancy identification circuitry, data editing circuitry and data display circuitry. Data stored in the first memory is compared with data stored in the second memory and discrepancies are identified and if desired the first data set is automatically revised to conform to the second data set. The system gives the user an authorized validation message when the account is reconciled. It also provides for pre-reconciliation error detecting and float projecting for estimating real balances based upon typical transaction clearing delays.

20 Claims, 26 Drawing Sheets

(From Fig 1, Step 9)

(From Fig 1, Step 4)

(From Figs 2,3, or 8)

(From Fig 6, Step 231)

(From Fig 11, Step 1772)

(From Fig 1, Step 14)

(From Fig 12, Step 2138)

(From Fig 1, Step 15)

FIGURE 16

FIRST NATIONAL BANK OF TOMORROW ABC ACCOUNT
AUTOMATICALLY BALANCED CHECKING

| PREVIOUS BAL. | DEPOSITS | WITHDRAWALS | BALANCE FORWARD |
|---|---|---|---|
| 0.00 | 3000.00 | 1221.11 | 1778.89 |

DEPOSITS:
01-28-85      1000.00
01-31-85      2000.00

CHECKS AND OTHER WITHDRAWALS:

| DATE: | CK# | AMT. | PAYEE: | FOR: |
|---|---|---|---|---|
| 01-29-85 | 100 | 111.01 | DR. I.C. RASH, DERMATOLOGIST | ACNE MEDICINE |
| 01-29-85 | 101 | 222.02 | TWO TIMERS CLOCK SHOP | WIND DOWN |
| 01-30-85 | 102 | 333.03 | 3 PIGS BARBQUE EMPORIUM | PIGOUT |
| OUTSTDG. | 103 | 444.04 | 4 SEASONS RETIREMENT HOME | RESERVE A ROOM |
| 03-01-85 | 104 | 555.05 | FIVE FINGERS HOCK SHOP | LOAN |
| OUTSTDG. | 105 | 672.06 | SIX FEET UNDER MORTUARY | PLOT |

>>>>>>>>>>>>>>>>    I N   B A L A N C E    <<<<<<<<<<<<<<<<

===

SUPPLEMENTARY LISTOUT

CHECK REGISTER LISTOUT: (From your checkbook)

| TRANSACT.# | WITHDRAWAL: | DEPOSIT: | DATE: | TIME: |
|---|---|---|---|---|
| 99.01 | | 1000.00 | 01-26-85 | 10:00 |
| 100 | 111.01 | | 01-27-85 | 11:45 |
| 101 | 222.02 | | 01-27-85 | 14:27 |
| 102 | 333.03 | | 01-28-85 | 10:47 |
| 102.01 | | 2000.00 | 01-31-85 | 08:00 |
| 103 | 444.04 | | 02-28-85 | 11:47 |
| 104 | 555.05 | | 02-28-85 | 15:07 |
| 105 | 672.06 | | 02-28-85 | 15:30 |

BANK RECORD LISTOUT: (From bank files)

| # | WITHDRAWAL | DEPOSIT | DATE |
|---|---|---|---|
| 100 | 111.01 | | 01-29-85 |
| 101 | 222.02 | | 01-29-85 |
| 102 | 333.03 | | 01-30-85 |
| 103 | | | |
| 104 | 555.05 | | 03-01-85 |
| 1 | | 1000.00 | 01-28-85 |
| 2 | | 2000.00 | 01-31-85 |

FIGURE 17

FIRST NATIONAL BANK OF TOMORROW ABC ACCOUNT
AUTOMATICALLY BALANCED CHECKING

| PREVIOUS BAL. | DEPOSITS | WITHDRAWALS | BALANCE FORWARD |
|---|---|---|---|
| 0.00 | 3000.00 | 1221.11 | 1778.89 |

DEPOSITS:
| | |
|---|---|
| 01-28-85 | 1000.00 |
| 01-31-85 | 2000.00 |

CHECKS AND OTHER WITHDRAWALS:

| DATE: | CK# | AMT. | PAYEE: | FOR: |
|---|---|---|---|---|
| 01-29-85 | 100 | 111.01 | DR. I.C. RASH, DERMATOLOGIST | ACNE MEDICINE |
| 01-29-85 | 101 | 222.02 | TWO TIMERS CLOCK SHOP | WIND DOWN |
| 01-30-85 | 102 | 333.03 | 3 PIGS BARBQUE EMPORIUM | PIGOUT |
| | | | ^ Error in AMOUNT OF CHECK. Check register says 3333.03 | |
| OUTSTDG. | 103 | 444.04 | 4 SEASONS RETIREMENT HOME | RESERVE A ROOM |
| 03-01-85 | 104 | 555.05 | FIVE FINGERS HOCK SHOP | LOAN |
| OUTSTDG. | 105 | 672.06 | SIX FEET UNDER MORTUARY | PLOT |

═══════════════════════════════════════════

SUPPLEMENTARY LISTOUT:

CHECK REGISTER LISTOUT: (From your checkbook)

| TRANSACT.# | WITHDRAWAL: | DEPOSIT: | DATE: | TIME: |
|---|---|---|---|---|
| 99.01 | | 1000.00 | 01-26-85 | 10:00 |
| 100 | 111.01 | | 01-27-85 | 11:45 |
| 101 | 222.02 | | 01-27-85 | 14:27 |
| 102 | --> 3333.03 <-- | | 01-28-85 | 10:47 |
| 102.01 | | 2000.00 | 01-31-85 | 08:00 |
| 103 | 444.04 | | 02-28-85 | 11:47 |
| 104 | 555.05 | | 02-28-85 | 15:07 |
| 105 | 672.06 | | 02-28-85 | 15:30 |

BANK RECORD LISTOUT: (From bank files)

| | | | |
|---|---|---|---|
| 100 | 111.01 | | 01-29-85 |
| 101 | 222.02 | | 01-29-85 |
| 102 | --> 333.03 <-- | | 01-30-85 |
| 103 | | | |
| 104 | 555.05 | | 03-01-85 |
| 1 | | 1000.00 | 01-28-85 |
| 2 | | 2000.00 | 01-31-85 |

FIGURE 18

FIRST NATIONAL BANK OF TOMORROW ABC ACCOUNT
AUTOMATICALLY BALANCED CHECKING

| PREVIOUS BAL. | DEPOSITS | WITHDRAWALS | BALANCE FORWARD |
|---|---|---|---|
| 0.00 | 3000.00 | 1221.11 | 1778.89 |

DEPOSITS:
| | |
|---|---|
| 01-28-85 | 1000.00 |
| 01-31-85 | 2000.00 |

CHECKS AND OTHER WITHDRAWALS:

| DATE: | CK# | AMT. | PAYEE: | FOR: |
|---|---|---|---|---|
| 01-29-85 | 100 | 111.01 | DR. I.C. RASH, DERMATOLOGIST | ACNE MEDICINE |
| 01-29-85 | 101 | 222.02 | TWO TIMERS CLOCK SHOP | WIND DOWN |
| 01-30-85 | 102 | 333.03 | 3 PIGS BARBQUE EMPORIUM | PIGOUT |
| OUTSTDG. | 103 | 444.04 | 4 SEASONS RETIREMENT HOME | RESERVE A ROOM |
| 03-01-85 | 104 | 555.05 | FIVE FINGERS HOCK SHOP | LOAN |
| OUTSTDG. | 105 | 672.06 | SIX FEET UNDER MORTUARY | PLOT |

>>>>>>>>>>>>>>>>   I N   B A L A N C E   <<<<<<<<<<<<<<<

═══════════════════════════════════════════════════════

SUPPLEMENTARY LISTOUT

CHECK REGISTER LISTOUT: (From your checkbook)

| TRANSACT.# | WITHDRAWAL: | DEPOSIT: | DATE: | TIME: |
|---|---|---|---|---|
| 99.01 | | 1000.00 | 01-26-85 | 10:00 |
| 100 | 111.01 | | 01-27-85 | 11:45 |
| 101 | 222.02 | | 01-27-85 | 14:27 |
| 102 | 333.03 | | 01-28-85 | 10:47 |
| 102.01 | | 2000.00 | 01-31-85 | 08:00 |
| 103 | 444.04 | | 02-28-85 | 11:47 |
| 104 | 555.05 | | 02-28-85 | 15:07 |
| 105 | 672.06 | | 02-28-85 | 15:30 |

BANK RECORD LISTOUT: (From bank files)

| | WITHDRAWAL | DEPOSIT | DATE |
|---|---|---|---|
| 100 | 111.01 | | 01-29-85 |
| 101 | 222.02 | | 01-29-85 |
| 102 | 333.03 | | 01-30-85 |
| 103 | | | |
| 104 | 555.05 | | 03-01-85 |
| 1 | | 1000.00 | 01-28-85 |
| 2 | | 2000.00 | 01-31-85 |

FIGURE 19

FIRST NATIONAL BANK OF TOMORROW ABC ACCOUNT
AUTOMATICALLY BALANCED CHECKING

| PREVIOUS BAL. | DEPOSITS | WITHDRAWALS | BALANCE FORWARD |
|---|---|---|---|
| 0.00 | 3000.00 | 1221.11 | 1778.89 |

DEPOSITS:
| | |
|---|---|
| 01-28-85 | 1000.00 |
| 01-31-85 | 2000.00 |

CHECKS AND OTHER WITHDRAWALS:

| DATE: | CK# | AMT. | PAYEE: | FOR: |
|---|---|---|---|---|
| 01-29-85 | 100 | 111.01 | DR. I.C. RASH, DERMATOLOGIST | ACNE MEDICINE |
| 01-29-85 | 101 | 222.02 | TWO TIMERS CLOCK SHOP | WIND DOWN |
| 01-30-85 | 102 | 333.03 | 3 PIGS BARBQUE EMPORIUM | PIGOUT |
| OUTSTDG. | 103 | 444.04 | 4 SEASONS RETIREMENT HOME | RESERVE A ROOM |
| 03-01-85 | 104 | 555.05 | ** YOU FAILED TO ENTER THIS CK INTO YOUR REGISTER | |
| OUTSTDG. | 105 | 672.06 | SIX FEET UNDER MORTUARY | PLOT |

---

SUPPLEMENTARY LISTOUT:

CHECK REGISTER LISTOUT: (From your checkbook)

| TRANSACT.# | WITHDRAWAL: | DEPOSIT: | DATE: | TIME: |
|---|---|---|---|---|
| 99.01 | | 1000.00 | 01-26-85 | 10:00 |
| 100 | 111.01 | | 01-27-85 | 11:45 |
| 101 | 222.02 | | 01-27-85 | 14:27 |
| 102 | 333.03 | | 01-28-85 | 10:47 |
| 102.01 | | 2000.00 | 01-31-85 | 08:00 |
| 103 | 444.04 | | 02-28-85 | 11:47 |
| 104 <-- | | | | |
| 105 | 672.06 | | 02-28-85 | 15:30 |

BANK RECORD LISTOUT: (From bank files)

| | | | |
|---|---|---|---|
| 100 | 111.01 | | 01-29-85 |
| 101 | 222.02 | | 01-29-85 |
| 102 | 333.03 | | 01-30-85 |
| 103 | | | |
| 104 <-- | 555.05 | | 03-01-85 |
| 1 | | 1000.00 | 01-28-85 |
| 2 | | 2000.00 | 01-31-85 |

FIGURE 20

FIRST NATIONAL BANK OF TOMORROW ABC ACCOUNT
AUTOMATICALLY BALANCED CHECKING

| PREVIOUS BAL. | DEPOSITS | WITHDRAWALS | BALANCE FORWARD |
|---|---|---|---|
| 0.00 | 3000.00 | 1221.11 | 1778.89 |

DEPOSITS:
| | |
|---|---|
| 01-28-85 | 1000.00 |
| 01-31-85 | 2000.00 |

CHECKS AND OTHER WITHDRAWALS:

| DATE: | CK# | AMT. | PAYEE: | FOR: |
|---|---|---|---|---|
| 01-29-85 | 100 | 111.01 | DR. I.C. RASH, DERMATOLOGIST | ACNE MEDICINE |
| 01-29-85 | 101 | 222.02 | TWO TIMERS CLOCK SHOP | WIND DOWN |
| 01-30-85 | 102 | 333.03 | 3 PIGS BARBQUE EMPORIUM | PIGOUT |
| OUTSTDG. | 103 | 444.04 | 4 SEASONS RETIREMENT HOME | RESERVE A ROOM |
| 03-01-85 | 104 | 555.05 | FIVE FINGERS HOCK SHOP | LOAN |
| OUTSTDG. | 105 | 672.06 | SIX FEET UNDER MORTUARY | PLOT |

>>>>>>>>>>>>>>>>    I N   B A L A N C E    <<<<<<<<<<<<<<<<

S U P P L E M E N T A R Y   L I S T O U T

---

CHECK REGISTER LISTOUT: (From your checkbook)

| TRANSACT.# | WITHDRAWAL: | DEPOSIT: | DATE: | TIME: |
|---|---|---|---|---|
| 99.01 | | 1000.00 | 01-26-85 | 10:00 |
| 100 | 111.01 | | 01-27-85 | 11:45 |
| 101 | 222.02 | | 01-27-85 | 14:27 |
| 102 | 333.03 | | 01-28-85 | 10:47 |
| 102.01 | | 2000.00 | 01-31-85 | 08:00 |
| 103 | 444.04 | | 02-28-85 | 11:47 |
| 104 | 555.05 | | 02-28-85 | 15:07 |
| 105 | 672.06 | | 02-28-85 | 15:30 |

BANK RECORD LISTOUT: (From bank files)

| | WITHDRAWAL | DEPOSIT | DATE |
|---|---|---|---|
| 100 | 111.01 | | 01-29-85 |
| 101 | 222.02 | | 01-29-85 |
| 102 | 333.03 | | 01-30-85 |
| 103 | | | |
| 104 | 555.05 | | 03-01-85 |
| 1 | | 1000.00 | 01-28-85 |
| 2 | | 2000.00 | 01-31-85 |

FIGURE 21

FIRST NATIONAL BANK OF TOMORROW ABC ACCOUNT
AUTOMATICALLY BALANCED CHECKING

| PREVIOUS BAL. | DEPOSITS | WITHDRAWALS | BALANCE FORWARD |
|---|---|---|---|
| 0.00 | 3000.00 | 1221.11 | 1778.89 |

DEPOSITS:
    \*\* Error: Deposit Amount. 01-31-85 for $200.00 Not received by bank
01-28-85            1000.00
01-31-85            2000.00
    \*\* Check Good Deposit of 01-31-85 for $2000.00 which is not in your checkbook.

CHECKS AND OTHER WITHDRAWALS:

| DATE: | CK# | AMT. | PAYEE: | FOR: |
|---|---|---|---|---|
| 01-29-85 | 100 | 111.01 | DR. I.C. RASH, DERMATOLOGIST | ACNE MEDICINE |
| 01-29-85 | 101 | 222.02 | TWO TIMERS CLOCK SHOP | WIND DOWN |
| 01-30-85 | 102 | 333.03 | 3 PIGS BARBQUE EMPORIUM | PIGOUT |
| OUTSTDG. | 103 | 444.04 | 4 SEASONS RETIREMENT HOME | RESERVE A ROOM |
| 03-01-85 | 104 | 555.05 | FIVE FINGERS HOCK SHOP | LOAN |
| OUTSTDG. | 105 | 672.06 | SIX FEET UNDER MORTUARY | PLOT |

===

SUPPLEMENTARY LISTOUT

CHECK REGISTER LISTOUT: (From your checkbook)

| TRANSACT.# | WITHDRAWAL: | DEPOSIT: | DATE: | TIME: |
|---|---|---|---|---|
| 99.01 | | 1000.00 | 01-26-85 | 10:00 |
| 100 | 111.01 | | 01-27-85 | 11:45 |
| 101 | 222.02 | | 01-27-85 | 14:27 |
| 102 | 333.03 | | 01-28-85 | 10:47 |
| 102.01 | | --> 200.00<-- | 01-31-85 | 08:00 |
| 103 | 444.04 | | 02-28-85 | 11:47 |
| 104 | 555.05 | | 02-28-85 | 15:07 |
| 105 | 672.06 | | 02-28-85 | 15:30 |

BANK RECORD LISTOUT: (From bank files)

| | WITHDRAWAL | DEPOSIT | DATE |
|---|---|---|---|
| 100 | 111.01 | | 01-29-85 |
| 101 | 222.02 | | 01-29-85 |
| 102 | 333.03 | | 01-30-85 |
| 103 | | | |
| 104 | 555.05 | | 03-01-85 |
| 1 | | 1000.00 | 01-28-85 |
| 2 | | 2000.00 | 01-31-85 |

FIGURE 22

FIRST NATIONAL BANK OF TOMORROW ABC ACCOUNT
AUTOMATICALLY BALANCED CHECKING

| PREVIOUS BAL. | DEPOSITS | WITHDRAWALS | BALANCE FORWARD |
|---|---|---|---|
| 0.00 | 3000.00 | 1221.11 | 1778.89 |

DEPOSITS:

\*\* Error: Deposit DATE. No deposit for $1000.00 on 01-17-85
01-28-85         1000.00
   \*\* Check your deposit of $1000.00 on 01-28-85 which is not in your checkbook.

01-31-85         2000.00

CHECKS AND OTHER WITHDRAWALS:

| DATE: | CK# | AMT. | PAYEE: | FOR: |
|---|---|---|---|---|
| 01-29-85 | 100 | 111.01 | DR. I.C. RASH, DERMATOLOGIST | ACNE MEDICINE |
| 01-29-85 | 101 | 222.02 | TWO TIMERS CLOCK SHOP | WIND DOWN |
| 01-30-85 | 102 | 333.03 | 3 PIGS BARBQUE EMPORIUM | PIGOUT |
| OUTSTDG. | 103 | 444.04 | 4 SEASONS RETIREMENT HOME | RESERVE A ROOM |
| 03-01-85 | 104 | 555.05 | FIVE FINGERS HOCK SHOP | LOAN |
| OUTSTDG. | 105 | 672.06 | SIX FEET UNDER MORTUARY | PLOT |

═══════════════════════════════════════════════

SUPPLEMENTARY LISTOUT

CHECK REGISTER LISTOUT: (From your checkbook)

| TRANSACT.# | WITHDRAWAL: | DEPOSIT: | DATE: | TIME: |
|---|---|---|---|---|
| 99.01 |  | 1000.00 | --> 01-17-85 <-- | 10:00 |
| 100 | 111.01 |  | 01-27-85 | 11:45 |
| 101 | 222.02 |  | 01-27-85 | 14:27 |
| 102 | 333.03 |  | 01-28-85 | 10:47 |
| 102.01 |  | 2000.00 | 01-31-85 | 08:00 |
| 103 | 444.04 |  | 02-28-85 | 11:47 |
| 104 | 555.05 |  | 02-28-85 | 15:07 |
| 105 | 672.06 |  | 02-28-85 | 15:30 |

BANK RECORD LISTOUT: (From bank files)

| | WITHDRAWAL | DEPOSIT | DATE |
|---|---|---|---|
| 100 | 111.01 |  | 01-29-85 |
| 101 | 222.02 |  | 01-29-85 |
| 102 | 333.03 |  | 01-30-85 |
| 103 |  |  |  |
| 104 | 555.05 |  | 03-01-85 |
| 1 |  | 1000.00 | --> 01-28-85 <-- |
| 2 |  | 2000.00 | 01-31-85 |

FIGURE 23

FIRST NATIONAL BANK OF TOMORROW ABC ACCOUNT
AUTOMATICALLY BALANCED CHECKING

| PREVIOUS BAL. | DEPOSITS | WITHDRAWALS | BALANCE FORWARD |
|---|---|---|---|
| 0.00 | 3000.00 | 1221.11 | 1778.89 |

DEPOSITS:
| | | |
|---|---|---|
| | 01-28-85 | 1000.00 |
| | 01-31-85 | 2000.00 |

CHECKS AND OTHER WITHDRAWALS:

| DATE: | CK# | AMT. | PAYEE: | FOR: |
|---|---|---|---|---|
| 01-29-85 | 100 | 111.01 | DR. I.C. RASH, DERMATOLOGIST | ACNE MEDICINE |
| 01-29-85 | 101 | 222.02 | TWO TIMERS CLOCK SHOP | WIND DOWN |
| 01-30-85 | 102 | 333.03 | 3 PIGS BARBQUE EMPORIUM | PIGOUT |

CHECK #103 WAS NOT ENTERED IN YOUR CHECK REGISTER SO ALL LATER CHECK NUMBERS ARE HIGH. YOU MAY HAVE VOIDED CHECK #103 AND FORGOTTEN TO MARK IT IN YOUR REGISTER. USE EDIT TO CORRECT YOUR REGISTER OR HIT = FOR AUTOMATIC CORRECTION.

---

SUPPLEMENTARY LISTOUT

CHECK REGISTER LISTOUT: (From your checkbook)

| TRANSACT.# | WITHDRAWAL: | DEPOSIT: | DATE: | TIME: |
|---|---|---|---|---|
| 99.01 | | 1000.00 | 01-26-85 | 10:00 |
| 100 | 111.01 | | 01-27-85 | 11:45 |
| 101 | 222.02 | | 01-27-85 | 14:27 |
| 102 | 333.03 | | 01-28-85 | 10:47 |
| 102.01 | | 2000.00 | 01-31-85 | 08:00 |
| 103 | 444.04 | | 02-28-85 | 11:47 |
| 104 | 555.05 | | 02-28-85 | 15:07 |
| 105 | 672.06 | | 02-28-85 | 15:30 |

BANK RECORD LISTOUT: (From bank files)

| | | | |
|---|---|---|---|
| 100 | 111.01 | | 01-29-85 |
| 101 | 222.02 | | 01-29-85 |
| 102 | 333.03 | | 01-30-85 |
| 103 | | | |
| 104 | 555.05 | | 03-01-85 |
| 1 | | 1000.00 | 01-28-85 |
| 2 | | 2000.00 | 01-31-85 |

FIGURE 24

FIRST NATIONAL BANK OF TOMORROW ABC ACCOUNT
AUTOMATICALLY BALANCED CHECKING

| PREVIOUS BAL. | DEPOSITS | WITHDRAWALS | BALANCE FORWARD |
|---|---|---|---|
| 0.00 | 3000.00 | 1221.11 | 1778.89 |

DEPOSITS:
| | | |
|---|---|---|
| 01-28-85 | 1000.00 | |
| 01-31-85 | 2000.00 | |
| OUTSTDG. | 3000.00 | Checkbook deposit date of 03-02-85 |

CHECKS AND OTHER WITHDRAWALS:

| DATE: | CK# | AMT. | PAYEE: | FOR: |
|---|---|---|---|---|
| 010-29-85 | 100 | 111.01 | DR. I.C. RASH, DERMATOLOGIST | ACNE MEDICINE |
| 01-29-85 | 101 | 222.02 | TWO TIMERS CLOCK SHOP | WIND DOWN |
| 01-30-85 | 102 | 333.03 | 3 PIGS BARBQUE EMPORIUM | PIGOUT |
| OUTSTDG. | 103 | 444.04 | 4 SEASONS RETIREMENT HOME | RESERVE A ROOM |
| 03-01-85 | 104 | 555.05 | FIVE FINGERS HOCK SHOP | LOAN |
| OUTSTDG. | 105 | 672.06 | SIX FEET UNDER MORTUARY | PLOT |

>>>>>>>>>>>>>>>>      I N   B A L A N C E      <<<<<<<<<<<<<<<<

═══════════════════════════════════════════════════

SUPPLEMENTARY LISTOUT

CHECK REGISTER LISTOUT: (From your checkbook)

| TRANSACT.# | WITHDRAWAL: | DEPOSIT: | DATE: | TIME: |
|---|---|---|---|---|
| 99.01 | | 1000.00 | 01-26-85 | 10:00 |
| 100 | 111.01 | | 01-27-85 | 11:45 |
| 101 | 222.02 | | 01-27-85 | 14:27 |
| 102 | 333.03 | | 01-28-85 | 10:47 |
| 102.01 | | 2000.00 | 01-31-85 | 08:00 |
| 103 | 444.04 | | 02-28-85 | 11:47 |
| 104 | 555.05 | | 02-28-85 | 15:07 |
| 105 | 672.06 | | 02-28-85 | 15:30 |
| 105.01 | | 3000.00 | 03-02-85 | 08:00 |

BANK RECORD LISTOUT: (From bank files)

| | | | |
|---|---|---|---|
| 100 | 111.01 | | 01-29-85 |
| 101 | 222.02 | | 01-29-85 |
| 102 | 333.03 | | 01-30-85 |
| 103 | | | |
| 104 | 555.05 | | 03-01-85 |
| 1 | | 1000.00 | 01-28-85 |
| 2 | | 2000.00 | 01-31-85 |

FIGURE 25

TAX TRACK YEAR END SUMMARY

TAX CATEGORY # 3    MEDICAL    PERIOD: 01/01/84 - 12/29/84

| DATE: | AMOUNT: | PAYEE: | PURPOSE: |
|---|---|---|---|
| 01/02/84 | 45.00 | MEDEMERGENCY CLINIC | BILLY'S ARM |
| 01/18/84 | 114.00 | DR. JACK U. PRICE | PAINFUL ITCH |
| 02/15/84 | 35.00 | DR. O. B. GYN | SURPRISE FOR SAM |
| 03/02/84 | 175.00 | DIAGNOSTIC ULTRASOUND | LOOK AT BABY |
| 08/19/84 | 735.00 | DR. O. B. GYN | DELIVERY |
| 08/19/84 | 1,275.00 | MEMPHIS HOSPITAL | ROOM FEES |
| 10/27/84 | 45.00 | DR. O. B. GYN | ANOTHER SURPRISE |
| 12/01/84 | 500.00 | DR. BEN GETTINMORE | SAM'S ULCER |
|  | 2,924.00 | TOTAL MEDICAL FOR PERIOD |  |

TAX CATEGORY # 4    ENTERTAINMENT    PERIOD: 01/01/84 - 12/29/84

| DATE: | AMOUNT: | PAYEE: | PURPOSE: |
|---|---|---|---|
| 01/27/84 | 11.19 | RITA'S RAUNCHY RIBS | LUNCH W/MONSANTO |
| 02/18/84 | 18.19 | CHARLIES CHILI | SAM WALTON- IBM |
| 02/19/84 | 9.18 | HOT DOG HEAVEN | ERINE TIBBS- CHRYSLER |
| 03/10/84 | 8.19 | MELVIN'S MEXICAN | JOSE MENDEZ- TEXAS A&M |
| 11/10/84 | 374.27 | JUSTINES | LOLA G. - MISC. |
|  | 543.02 | TOTAL ENTERTAINMENT FOR PERIOD. |  |

FIGURE 26

Is the information you want to search with 1. Payee  2. Amount  3. Purpose or 4. Date
Touch the number of your choice:   1

Enter the name (or any part of the name) of the payee whose information you want to see:
NEW YORK

Printing your requested data for your payee named:   NEW YORK...

| DATE: | AMOUNT: | PAYEE: | PURPOSE: |
|---|---|---|---|
| 01/01/84 | 124.14 | NEW YORK LIFE | QUARTERLY INS. PAYMENT |
| 04/01/84 | 124.14 | NEW YORK LIFE INS. | QUARTERLY INS. PAYMENT |
| 10/01/84 | 124.14 | NEW YORK INS. | QUARTERLY INS. PAYMENT |
|  | 372.42 |  |  |

END.

---

Is the information you want to search with 1. Payee  2. Amount  3. Purpose or 4. Date
Touch the number of your choice:   4

Enter the range of dates you want to see (in the form 01/01/84-01/04/84):

10/22/84-10/24/84

| DATE: | AMOUNT: | PAYEE: | PURPOSE: |
|---|---|---|---|
| 10/22/84 | 19.94 | ROBERTS NURSERY | FERTILIZER |
| 10/22/84 | 47.19 | BILL'S BUILDING MART. | INSULATION |
| 10/23/84 | 200.00 | CENTRAL BAPTIST | TITHE |
| 10/24/84 | 78.19 | FOOD MART | GROCERIES |
|  | 345.32 |  |  |

END.

ELECTRONIC CHECKBOOK WITH AUTOMATIC RECONCILIATION

This application is a continuation of application Ser. No. 872,971, filed June 12, 1986, now abandoned.

BACKGROUND OF THE INVENTION

An improvement on the current means of managing a checking account and various financial transaction relationships, Automatically Balanced Checking (referred to herein alternatively as ABC Banking) consists of a specially configured and programmed computer (referred to as the Electronic Check Register or ECR) that can fit in the checkbook cover slot that usually contains a paper check register. The ECR can capture the user's full range of financial transactions with less effort and time than the traditional paper check register requires. It can also automatically synchronize each transaction with those captured in the bank's transit department, silently warn the user before he writes a check that will result in a returned ("bounced") check, warn the user when a check he is writing will incur a service charge or other penalty, and prevent many serious check writing errors before they create problems. Such errors may include: entering the wrong check number, failing to enter the check number, entering the wrong date for a check, failing to enter the check date, entering the wrong deposit date, failing to enter the deposit date, writing a check but failing to enter it in the check register, entering a check in the register and then failing to write the check without correcting the register, entering the same check twice, etc. The ECR may also self-communicate with the bank's host computer via a communications module to perform a wide variety of other previously impossible functions. One version of the ECR can perform similar functions in an office environment, where portability is less desirable and extended peripheral devices and memory are more desirable.

In addition to the above, Automatically Balanced checking may include point of sale data capture, self administered communications with the bank host, automatic transaction synchronization and synchronization correction at the transaction level along with a unique, functionally integrated host system. The system of the present invention produces a new kind of transaction accounting system that can also simplify and speed up the check register recording process, capture extended data for extended optional reporting, coordinate telephone bill payment, debit card, automatic teller machine and other transactions into one concise transaction accounting system with check payments and deposits. The present invention also eliminates the need for check return, bank fine sort or monthly mailed statements as well as perform automatic account balancing/reconciliation with both automatic and user directed error correction.

Additionally, a broad range of reports on transactions can be called up and printed at the user site. These reports, like the bank statement itself, can show not only the check number, date and amount but the full payee information and purpose information next to each transaction as well. Also, the statement and any desired reports can be "rendered" whenever the user desires, whether it fits the bank's usual statement cycles or not, and deliver up to the moment information with the full transaction image rather than the previously possible two sets of records (with uncleared items dealt with as outstanding items), without detail or with any transactions not cleared by both sources disregarded altogether.

Transactions may be captured routinely as they occur and as they would normally be entered into a paper register, except that specialized functions within the Electronic Check Register reduce the amount of information required at manual entry. No additional data entry paperwork, file setup or programming is required.

SUMMARY OF THE INVENTION

The invention relates to a system for transaction accounting and, more specifically, to an improved transaction management and reporting system. While it provides a system to better manage balances and transactions for any entity having frequent transactions with another, the flow charts and text in summary here describe, as an example, the financial institution to customer relationship (extended applications being obvious to those involved in transaction management).

This is accomplished by the uniquely synchronized transaction capture and data management system integration of the bank's host (or front end computer to bank's host) which is able to access the bank's records and (via direct communication automatically dialed over telephone lines) a device that can be placed in the checkbook cover, the Electronic Check Register. The ECR allows the data capture, automatic transaction match tagging, editing, modification, time matching, and other abilities necessary to accomplish (by communication of thus captured data and other necessary information) the automatic balance and transaction reconciliation of the user's account (without reentry of data, specialized training, or the use of additional external devices or software).

Deposit and other pre-agreed credits or debits can be automatically entered into the ECR from the bank host followed by documentation of such auto-entrys on the statement at the time of reconciliation. Error explanations are integrated within the statement itself to automatically explain in detail what is out of balance and why. This includes arrows pointing to erroneous transactions on the statement as well as text next to the error explaining it. The user can then have every error displayed corrected automatically including automatic correction of his own Electronic Check Register with a single keystroke approval.

Further, the full automatic capture at the point of sale with synchronized transaction tracking and automatically matched transactions permits the transmission from the host to the user of a full statement. The statement not only reflects all transactions (including those just prior to the automatic reconciliation) but displays on the statement the full check image with (in addition to the usual check number, date and amount) complete Payee and Purpose of Payment information. This information is clearly integrated into a single statement with an automatic, full image display of outstanding items, with totals on the statement that can be "called" at any point in the bank statement cycle that the user desires.

Since the host ABC system resides as a separate module that can be limited to receiving only transaction listings ("strip files") nightly from transit data capture and other exchanges and sources on each account using the service, the ABC system does not need to otherwise affect other bank reporting or transaction systems. Therefore, the bank has the option of continuing to allow the return of paper checks and the monthly rendering of paper statements to be mailed. Or alternatively, the bank may elect to discontinue the labor intensive check fine sort process, some of the usual prestatement bulk filing effort, and the stuffing and mailing of checks back to the user as well as monthly statement rendering. This is because the present invention provides the user with full, up to the minute and complete information on the statement without any key entry or manual labor on the part of the bank. (If the user chooses not to have a printer, bank statements may be rendered as usual.)

Further, the ECR's abilities include: the ability to silently warn the user when a check being entered would result in a bad check or a fee of any kind, the ability to calculate the minimum float (using the internal clock and calendar and the clock and calendar matched full current transaction file to deliver the minimum balance at the bank) as well as the prevention of many of the most common and troublesome check writing errors as previously enumerated. The ECR also allows automatic entry, matched to transactions, of the correct time, date and check number reducing the check register data to be entered in the check out line, etc. while preventing errors. The ECR also provides for "Invisible Check Register" security and privacy functions which prevent a stolen or lost check register from being read by unauthorized persons, transaction "scanning" up and down the transaction history not as a hodgepodge of various deposit, check, adjustment, ATM, Bill Payment, etc. transactions but by transaction type, making it far simpler and faster to find a transaction. The ECR also permits automatic transaction search by check number, date, amount or payee, providing immediate display of the needed transaction automatically following the entry of the criteria desired.

BRIEF DESCRIPTION OF THE DRAWINGS

The foregoing and additional features and advantages of the invention will become more readily apparent from the detailed description of a specific illustrative embodiment thereof presented below in conjunction with a drawing that accompanies in which

FIG. 16 illustrates a sample balanced statement.

FIG. 17 illustrates a misentered check amount in the check resister.

FIG. 18 shows the same statement as FIG. 17 having been corrected by the user.

FIG. 19 illustrates a balance sheet which shows the customer that check no. 104 was not put in the check register.

FIG. 20 illustrates the results of the customer having automatically or manually corrected the balance sheet of FIG. 19.

FIG. 21 illustrates a balance sheet having a misentered deposit amount pointed out for automatic or manual correction.

FIG. 22 illustrates a balance sheet having a deposit date misentered into the check register.

FIG. 23 illustrates a balance sheet in which the customer has checks out of sequence.

FIG. 24 illustrates a balance sheet showing an outstanding deposit.

FIG. 25 illustrates a tax tracking year-end summary.

FIG. 26 illustrates use of the invention in the database query mode.

DESCRIPTION OF THE PREFERRED EMBODIMENT

Figure 1:
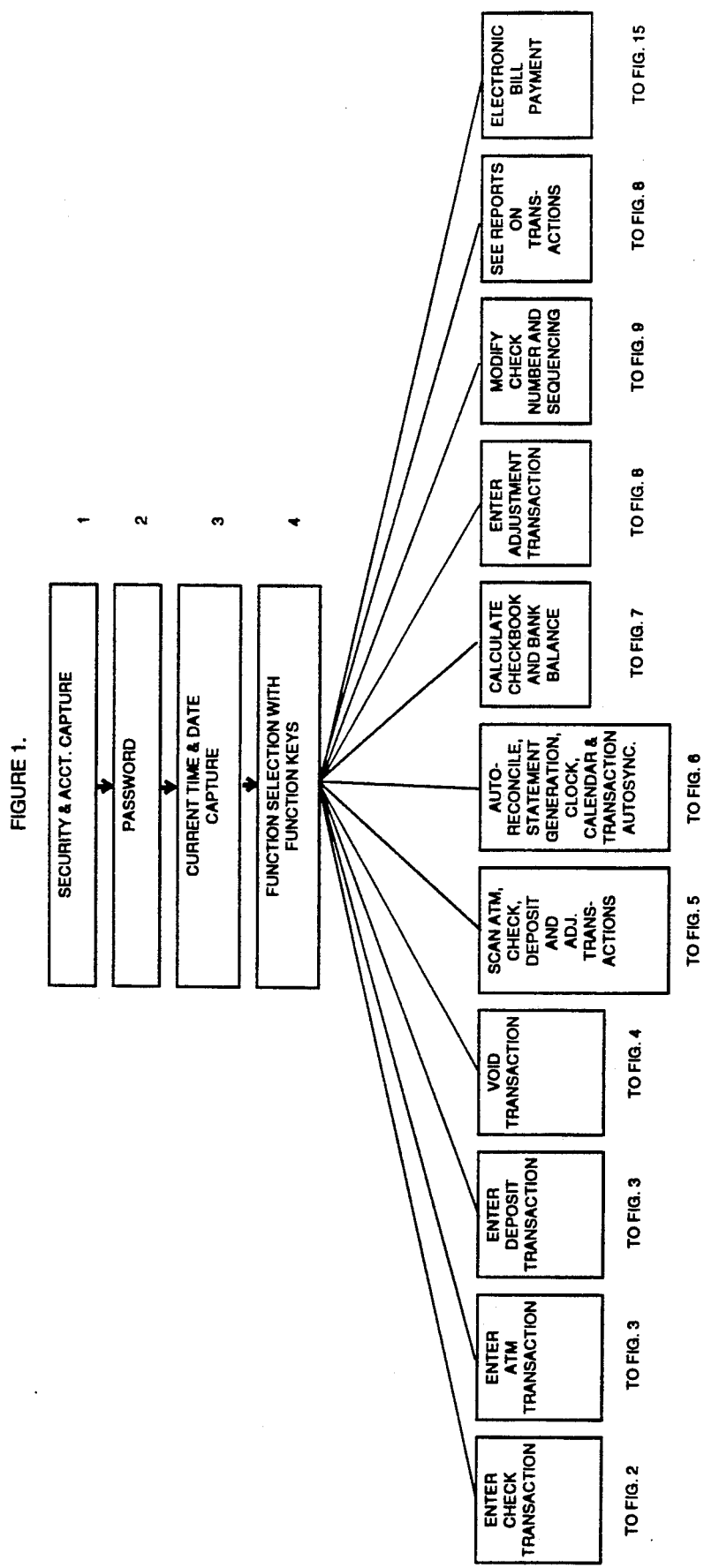
FIG. 1 illustrates a systematic flow of a hand-held ECR and its user selectable functions.

Referring now to FIG. 1, step 1, at account opening a security and account number is assigned to the user and entered into the protected memory of the hand-held Electronic Check Register. Further, in FIG. 1, step 2, a user selected password is keyed in, to be later matched at the host with the security and account number previously captured using a unique algorithm. In FIG. 1, step 3 the time and date is also entered into the ECR, which data is forwarded to set the clock and calendar module of the ECR. This clock and calendar module will then be used by the other functions to identify and synchronize subsequent transactions. After initial data capture of system parameters, functions are routinely directed with function keys, as shown flowing downward from FIG. 1, step 4, to include the user selectable functions.

Figure 2:
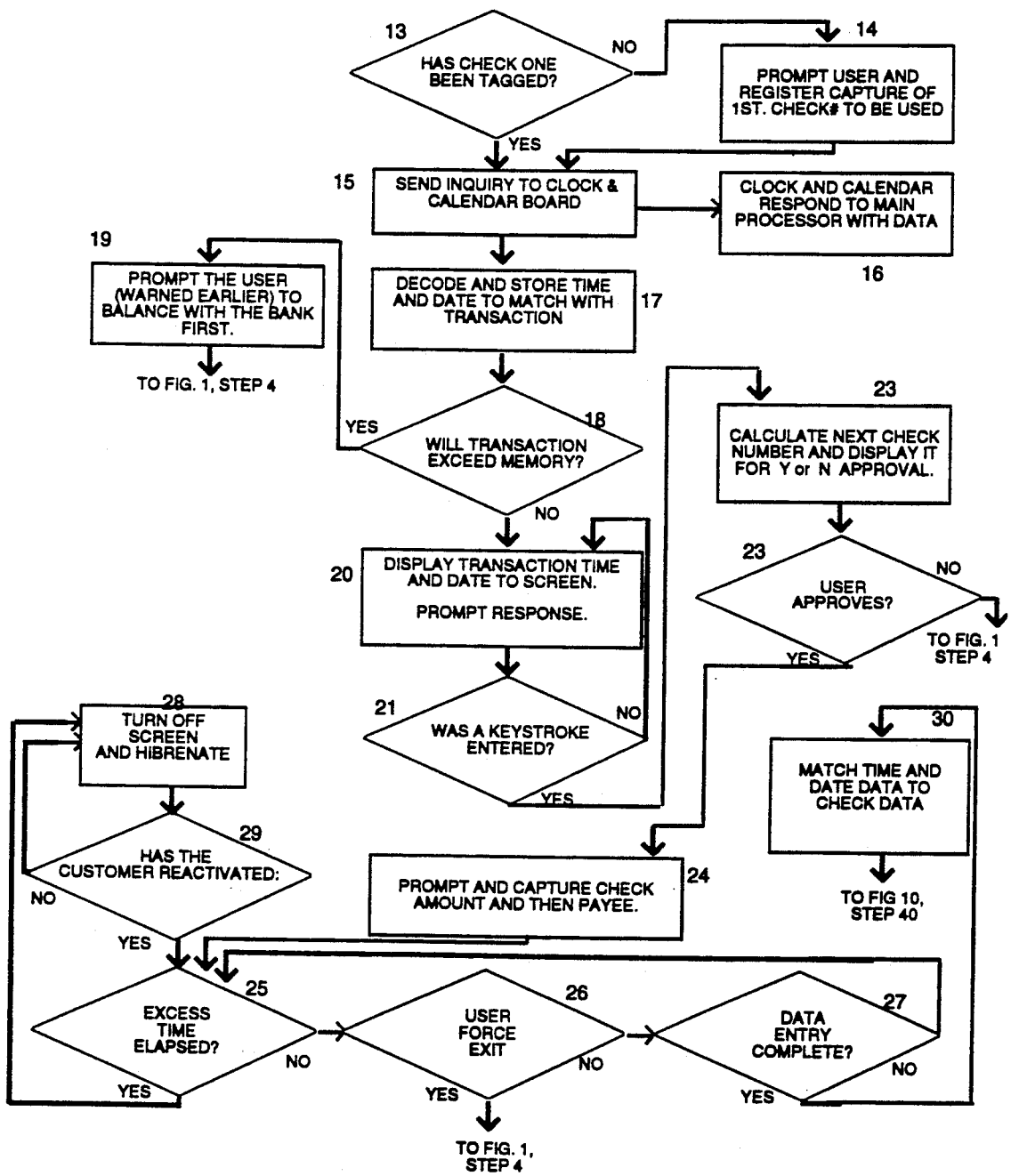
FIG. 2 illustrates a system of check transaction capture.

When check entry is selected from FIG. 1, step 4, FIG. 2 then summarizes the subsequent procedures. First, in FIG. 2, step 13, if the first check number in the user's checkbook numerical sequence has not been keyed in, the ECR display prompts it's entry (FIG. 2, step 14). This entry, like all parameters, security numbers, and data, is stored in non-volatile or battery protected memory. With the upcoming check number now available )FIG. 2, step 15), an inquiry to the clock and calendar module is made with the clock and calendar module responding to the main processor to provide accurate time and date to be later matched to the transaction, should it be completed (steps 15 through 17).

FIG. 2, step 18 determines whether or not there is enough memory for an additional transaction and, if not, prompts the user to balance with the bank (i.e., select the reconcilement option of FIG. 1, step 10 from FIG. 1, step 4) which will then, after transmitting stored data, leave more than adequate room for subsequent transactions. The user is advised well in advance after each check (FIG. 10, step 41), if he is beginning to run out of memory, to "balance with the bank—N transactions left" (where N is the number remaining possible transactions). Should FIG. 2, step 18 be negative, the transaction, time and date is displayed on the screen for the user until the keystroke is entered (FIG. 2, step 21). When Step 21 is positive, i.e., when the user's keystroke signals to proceed, the next check number to be written is calculated with reference to the last check written in memory, and the first check number entered in B14. Step 23 awaits the user's yes or no response and, should that response be negative, returns to the main menu function selection (FIG. A4).

It is important to note this automatic tracking of transaction number and the difference from the number on the paper check just below the ECR in the checkbook cover when in an error condition. The unwillingness of the logic to accept anything but a Yes or No makes it visually obvious that an error has occurred if the user (i) is entering the wrong check number, (ii) is forgetting to enter the check number (the display will accept only Yes or No, not the amount), (iii) has written a check previously but failed to write the check (the paper check number will be lower than the one displayed), (iv) is entering the same check number for a second time. The error will also be made obvious if the user has at any time previous to the present transaction made any of the above mistakes and failed to notice it when writing the previous check. The mistake is made apparent for simple correction using the edit option described beginning in FIG. 1, step 9.

Figure 12:
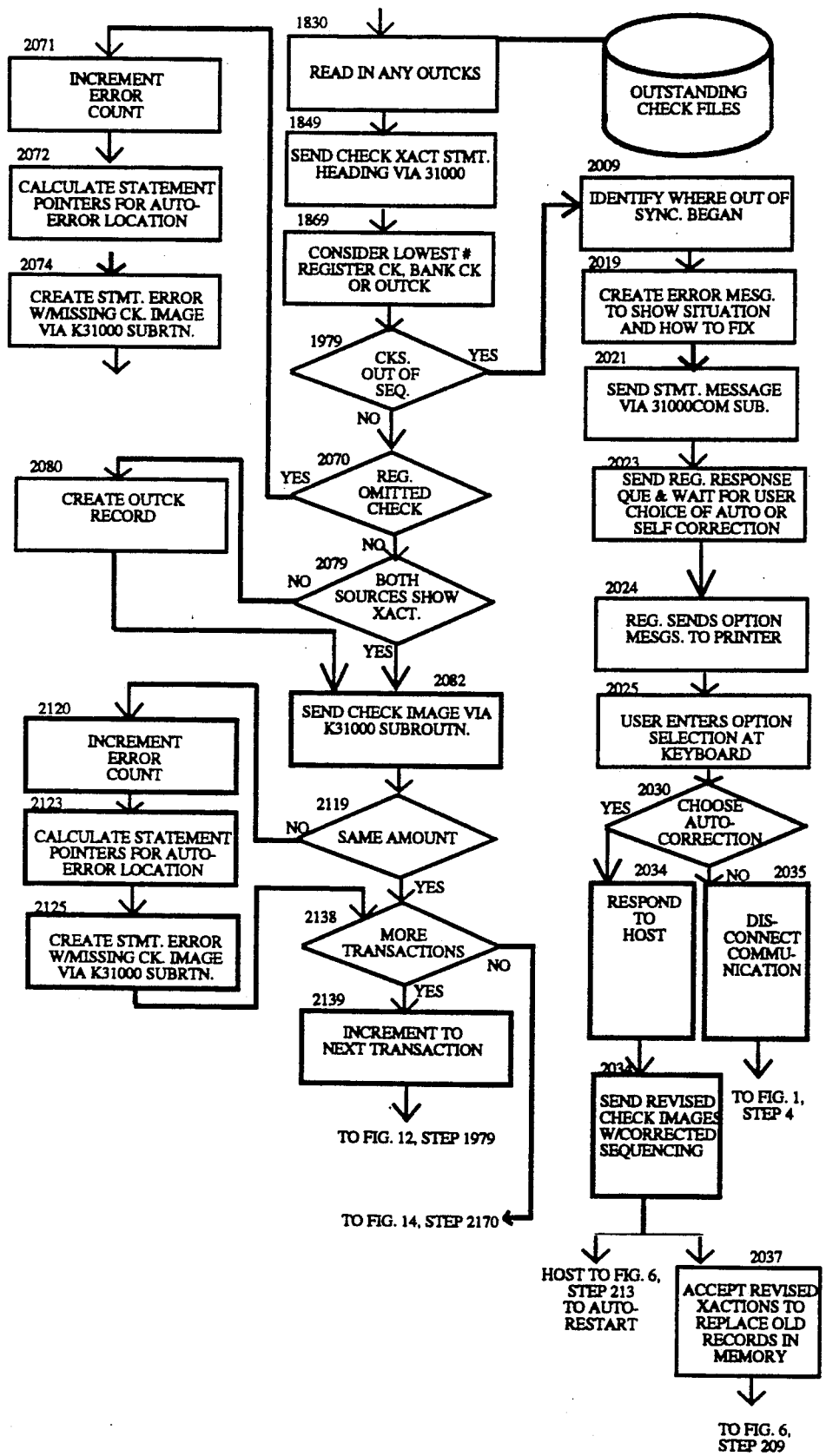
FIG. 12 illustrates the method of check reconciliation.

If the error is left until automatic reconcilement with the bank the host will sense the sequencing error in FIG. 12, step 1979 and correct it automatically with the user's ingle keystroke approval. To accomplish this correction, the host, in FIG. 12, step 2009, scans both sets of transactions (the host transit file and the Electronic Check Register version) and, upon finding a mismatch based on matching criteria, rescans to see if an adjacent transaction matches the desired criteria. If so, the host scans further to see if this integral offset continues down the transaction stream. If this is the case, an error message is sent to print to the statement being printed (or to the ECR display, if no printer is used) to offer the user the option of: (i) manual correction (ending the current reconcilement session and, off line, manually correcting the out of sequence items using the above mentioned edit functions), or (ii) automatic correction and Electronic Check Register transaction reentry. If the user desires automatic correction (per a single keystroke response sensed in FIG. 12, step 2030), the transaction numbers are renumbered at the host and the host sends the corrected transaction images to the ECR, where they replace the old images in memory (FIG. 12, step 2037).

Figure 7:
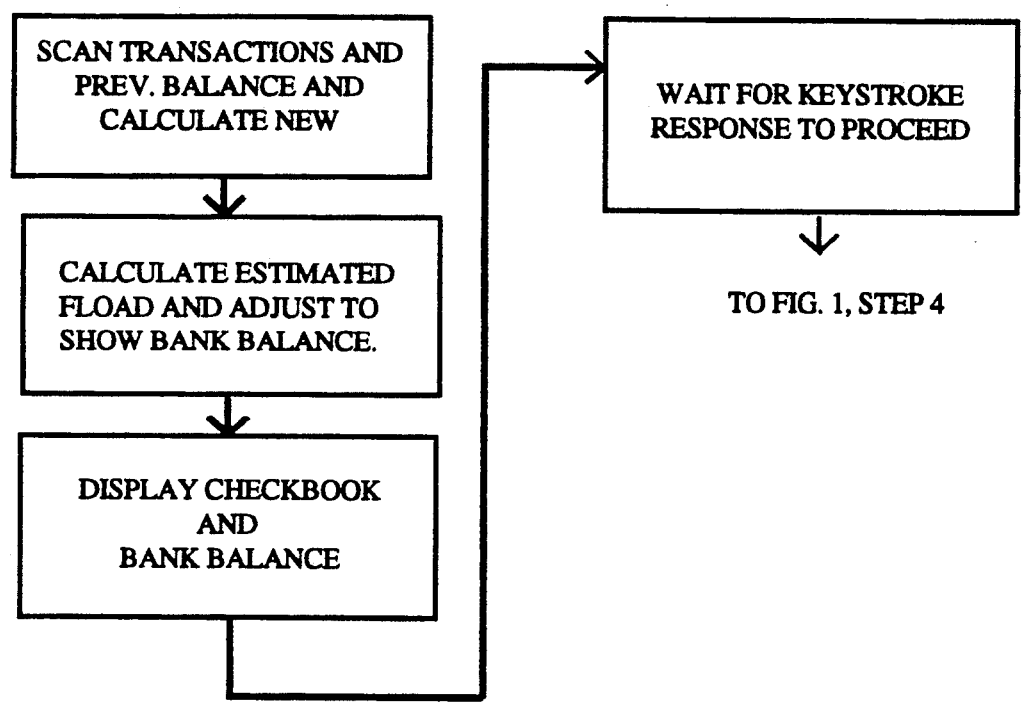
FIG. 7 illustrates the automatic calculation of checkbook balance as well as automatic calculation approximation of float adjusted bank balance.
Figure 10:
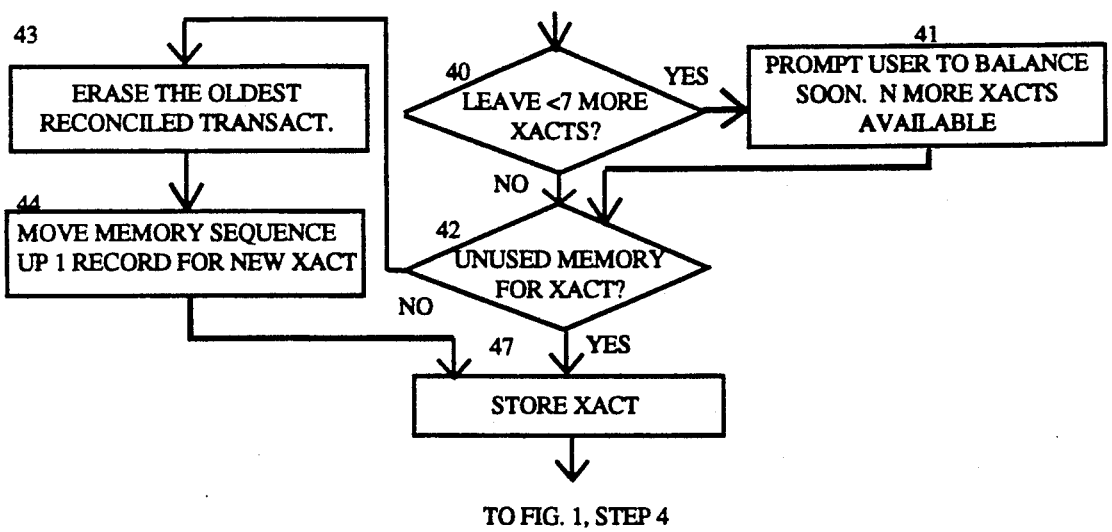
FIG. 10 illustrates the revolving transaction management in the ECR, called from other data capture steps (such as those illustrated in FIGS. 2, 3 and 8) rather than by user function key selection to provide the largest possible number of historical transactions available for display in the register in addition to current (not yet reconciled to host) transactions.

Assuming a positive response to FIG. 2, step 23, the check register continues (in Step 24) to capture from its keyboard the user's check amount and payee/purpose information. Steps 25, 26, 27 and 29 sense, respectively: (i) access time elapsing (in which case the screen is turned off in 28, but the memory is preserved to protect the battery), (ii) a user command to exit with either a force key or a function key (in which case it's returned to FIGS. 1, step 4), (iii) data entry completion (in which case the time and date are matched to the check data in FIG. 2, step 30). Then, in Step 40, the revolving management system shown in FIG. 10 checks to see if the transaction memory available has reached the customer warning level referred to above. If that is the case, FIG. 10, step 41 notifies the customer and proceeds onto FIG. 10, step 42. FIG. 10, step 40 considers how much room is in memory to store live unreconciled transactions (including erasing the oldest transaction that has already been reconciled with the bank). Step 42 considers if there is any need to erase old reconciled data to make room for the new transaction. If there is unused memory, no automatic memory remapping is required. If there is no unused memory, then the oldest transaction is deleted to make room for the newest (FIG. 10, step 43) and all check memory is remapped (FIG. 10, step 44). If there had been no room for the transaction thus entered, the transaction would have already been terminated in FIG. 2, steps 18 and 19. As a result, a large number of previously unreconciled transactions can be stored along with a maximum number of reconciled transactions, allowing the user to scan back and look at his recent history well beyond his current transactions. In FIG. 10, step 47 the new transaction (matched to the clock and calendar module data, payee and purpose information, as well as the date and check number), is stored in protected random access memory. Subsequent balance inquiries from the ECR keyboard (selected from FIG. 1, step 4) will then display the adjusted balance as described in FIG. 7.

ATM Transactions & Deposits

Automatic teller transactions and deposits, particularly when made in large numbers and with similar amounts exist, have always been a balancing problem. The ECR, therefore, uses its clock and calendar module to tag these transactions automatically to make possible automatic matching in the balancing processes and to minimize any need for user intervention.

Figure 3:
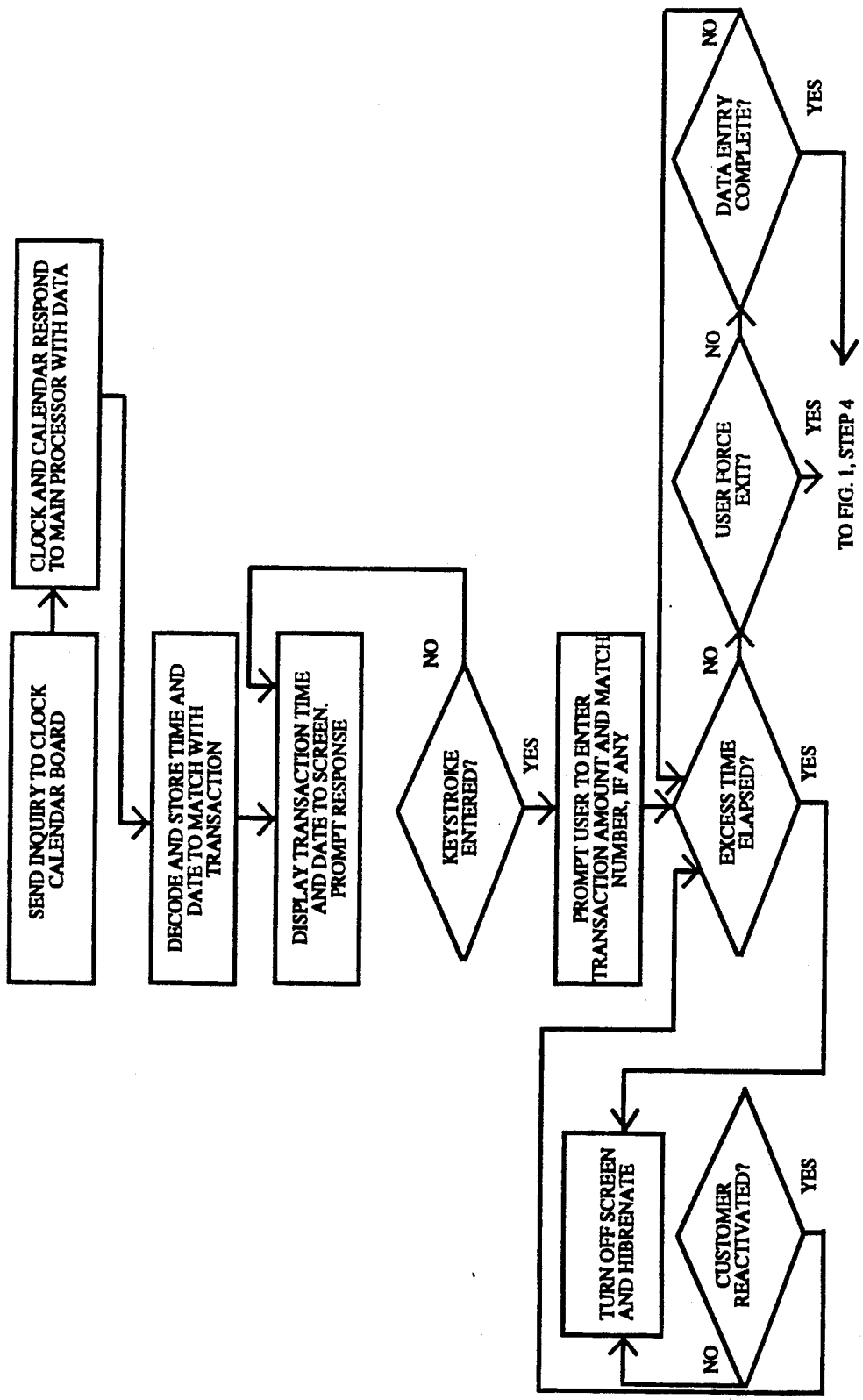
FIG. 3 illustrates a system of ATM transaction capture and deposit capture.

ATM and Deposit transactions (directed from FIG. 1, step 4 respectively, to function selection steps 6 and 7) proceed to steps 50 and 51 on FIG. 3. The main processor queries the clock and calendar module for time and date information, which is then stored in FIG. 3, step 52 for later matching to transaction (should that transaction by completed). FIG. 3, steps 54 and 53 protect memory and data (as did Steps 18 and 19 in FIG. 2). In FIG. 3, step 55 the time is displayed awaiting the keystroke to proceed in FIG. 3, step 56. Receiving that keystroke, the user is then prompted to enter the amount of the transaction. FIG. 3, step 58 through 62 protect data and memory by automatic shut down of power consuming utilities during long pauses, allowing "reawakening" and force exit. Upon completion of data entry, FIG. 3, step 63 takes a completed transaction and automatically matches it to the time, date and other transaction matching data (optional ATM, credit card, debit card, Bill Payment and other special "at transaction time interactive" additional matching codes are summarized below) and then forwards it to the revolving transaction management system (FIG. 10), where the transaction is stored. This manner of transaction capture with time/date and optional additional data matching allows the host logic at the bank to minimize user intervention by automatically matching its own bank day records.

Host Pre-Reconciliation Error Sensing

Since the ABC host knows both the transactions received by the bank as well as the ECR's pending check and deposit items, the ABC host has the unique ability to sense and respond to dangerous and/or embarrasing situations before they become a problem. For example, the ABC host, after receiving a transaction (either real time as the transaction happens or in nightly batch mode from strip files sent from the bank primary check processing system) calculates the new balance, including outstanding transactions. This permits the ABC host the unique ability to sense that a check is going to bounce (even though there is still money in the account) by virtue of the after outstanding clearings projected balance being negative. Since deposits generally clear faster than checks (generally the same business day), this is an important utility even if many check and deposit transactions have passed since the last reconciliation.

Further, the ABC host also compares Electronic Check Register forwarded outstanding checks from its ECROUTDEP file after each transaction for real time configured systems (or after each nightly file input for strip file applications). It then senses all amount errors in previously outstanding checks and deposits (by comparison of transit incoming amount with the time and/or transaction number matched outstanding transaction) as well as sensing deposits, previously thought to be outstanding (as in a deposit made in the night deposit box just prior to auto-reconciliation) that didn't occur on the following business day.

This unique ability to sense some serious potential errors prior to the coming account reconciliation is complimented by the ABC host's ability to automatically inform the user of the as yet unrealized problems. This notification can be made by automatic voice simulated phone notification, using a commercially available voice module attached to and directed automatically by the ABC host. It may be repeated periodically until a touch tone or standard interrupt dial acknowledgement response is received from the user. It may also be accomplished by mail (or even, with configuration modification, electronic mail, using an auto answer modem and a "middleman" processor which is becoming common in various home banking and home terminal systems). Or contact can be made by bank personnel operating from ABC host provided Overdraft Prevention Reports.

Voiding Transactions

Since no checkbook (either paper or electronic) can store an unlimited number of transactions, it must maintain those that are reasonably current and all of those that are active (not yet reconciled with the bank). The Revolving Transaction Management System (FIG. 10), as alluded to elsewhere herein, erases the oldest reconciled transaction to make room for each new transaction of each type. When there are fewer than a chosen minimum of such expendable transactions (seven used here for illustration), the Revolving Transaction System begins dropping hints that reconcilement should follow soon. Upon reconcilement, all transactions previously stored are expendable for newcoming transactions while being available for user scanning as long as memory permits. As a result, a transaction to be voided may be either: (i) a current transaction not yet reconciled with the bank, (ii) a previously reconciled transaction still in memory, or (iii) a previously reconciled transaction no longer stored in the ECR memory but stored in automatically matchable/retrievable fashion on the ABC host's disk files. The ABC system provides means to automatically reconcile all transactions, regardless of age, in the following manner.

Figure 4:
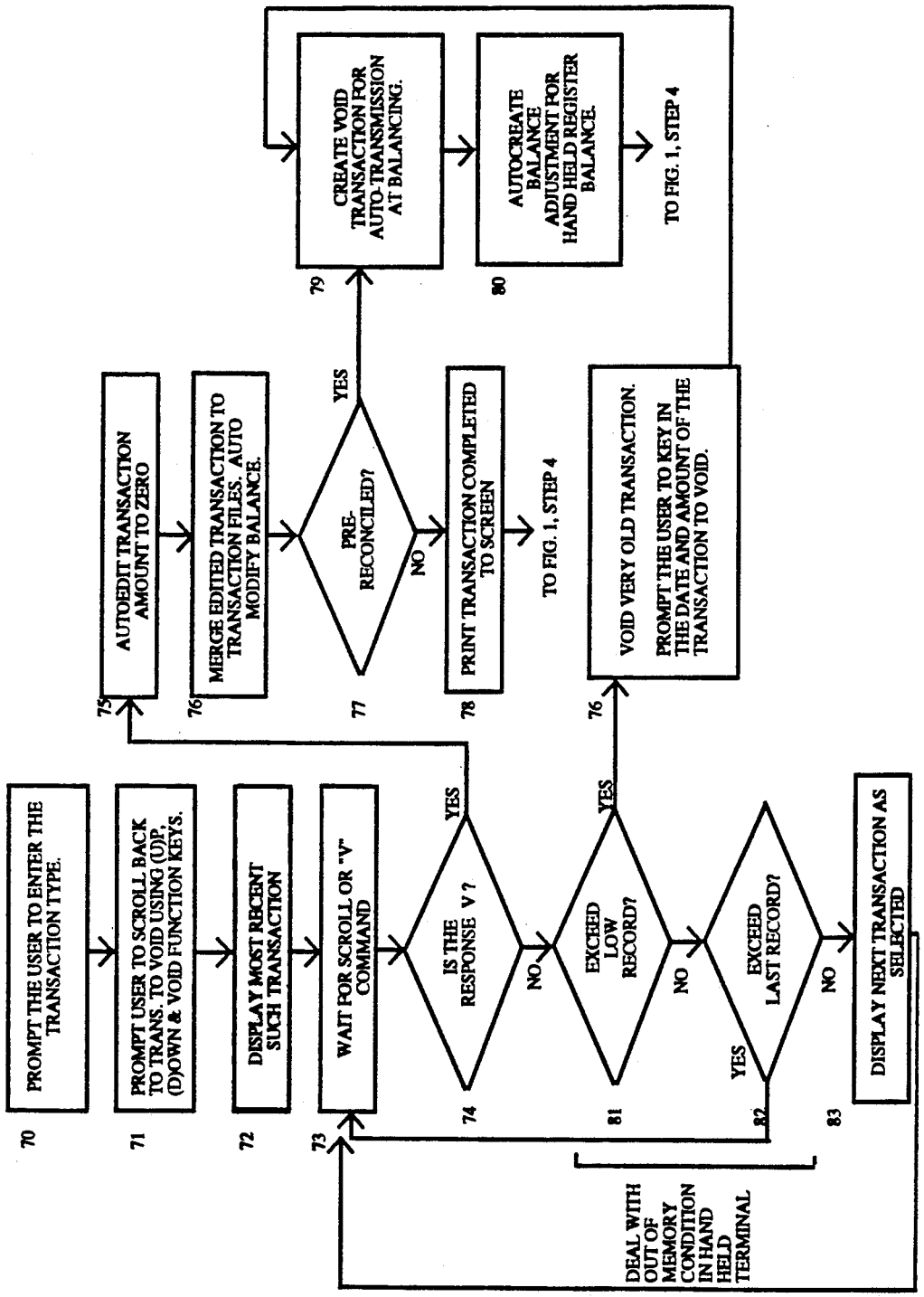
FIG. 4 illustrates the void of transaction process.

A user selecting the void option of FIG. 1, step 8 in FIG. 1, step 4 is prompted (as shown in FIG. 4 step 70) to enter the transaction type (check, deposit, adjustment, Bill Payment, ATM, etc.). He is then allowed to scroll (Step 71) back through the visual display of his transactions, from most recent to oldest, to find the transaction he desires to void. During the scrolling loop described in FIG. 10, steps 73, 74, 81, 82 and 83, FIG. 4, step 74 senses when the desired transaction has been reached. If desired transaction is found and selected by the user, FIG. 4, steps 75 and 76 modify and remerge the transaction image into the ECR's memory and display the change to the screen. If this transaction has not already been reconciled (as determined in FIG. 4, step 77) the transaction is complete, since the now adjusted entry will be the one sent to the bank at reconciliation. Therefore, FIG. 4, step 77 redirects non-reconciled transactions to completion with a completion message (FIG. 4, step 78), followed by redirection to main menu FIG. 1, step 4.

If, however, the transaction has already been reconciled, the ECR automatically creates a void transaction, stored in the ECR's memory, to be later transmitted at balancing to the host (FIG. 4, step 79). It also automatically creates a balance adjustment transaction to manage its internal balances before forwarding the user on to FIG. 1, step 4 from Fig. 4, step 80.

The last possibility, that it has been reconciled but is no longer in memory, is sensed in FIG. 4, step 81 when the oldest record has been displayed and the user continues to scroll back in time. If this test is positive, it prompts the user to key in the date and amount of the transaction to void (from the outstanding transaction listing on his statement). (Because of the control heirarchy of the ABC architecture, if it were not outstanding would have already been corrected). Then, in FIG. 4, step 79, automatically creates the void transaction for the later auto-transmission at balancing, followed by automatic creation of the balance adjustment transaction for the electronic check register and internal balance in FIG. 4, step 80 as above. FIG. 4, step 82 senses when the most recent or last entry has been displayed by the scrolling loop, which occurs when the user returns back down from the older transaction to the most recent. When this is the case there is no need to modify the already correct transaction of the screen and the system simply waits for the next command (FIG. 4, step 73).

Thus, the Electronic Check Register, in coordination with the host automatic system, automatically reconciles voids both at the host and the ECR (by pretransmission modification of transactions or post transmission special void transactions, whichever is appropriate). It also automatically reconciles the checkbook register's transactions and balance brought forward, even when transactions are so old they are no longer stored in memory.

Scan and/or Edit ATM, Check, Deposit and Adjustment Transactions

The ECR allows the user to view not only those current transactions that need to be transmitted to the bank, but also as many additional transactions back in time as the particular ECR model's memory allows. It allows these to be "called up" and scanned by individual transaction-type, making it substantially faster and less confusing to find a deposit among a sea of checks or an ATM transaction in a crowded checkbook. There is also an optional ability to find a transaction automatically by entering the amount, date, or check number.

Figure 5:
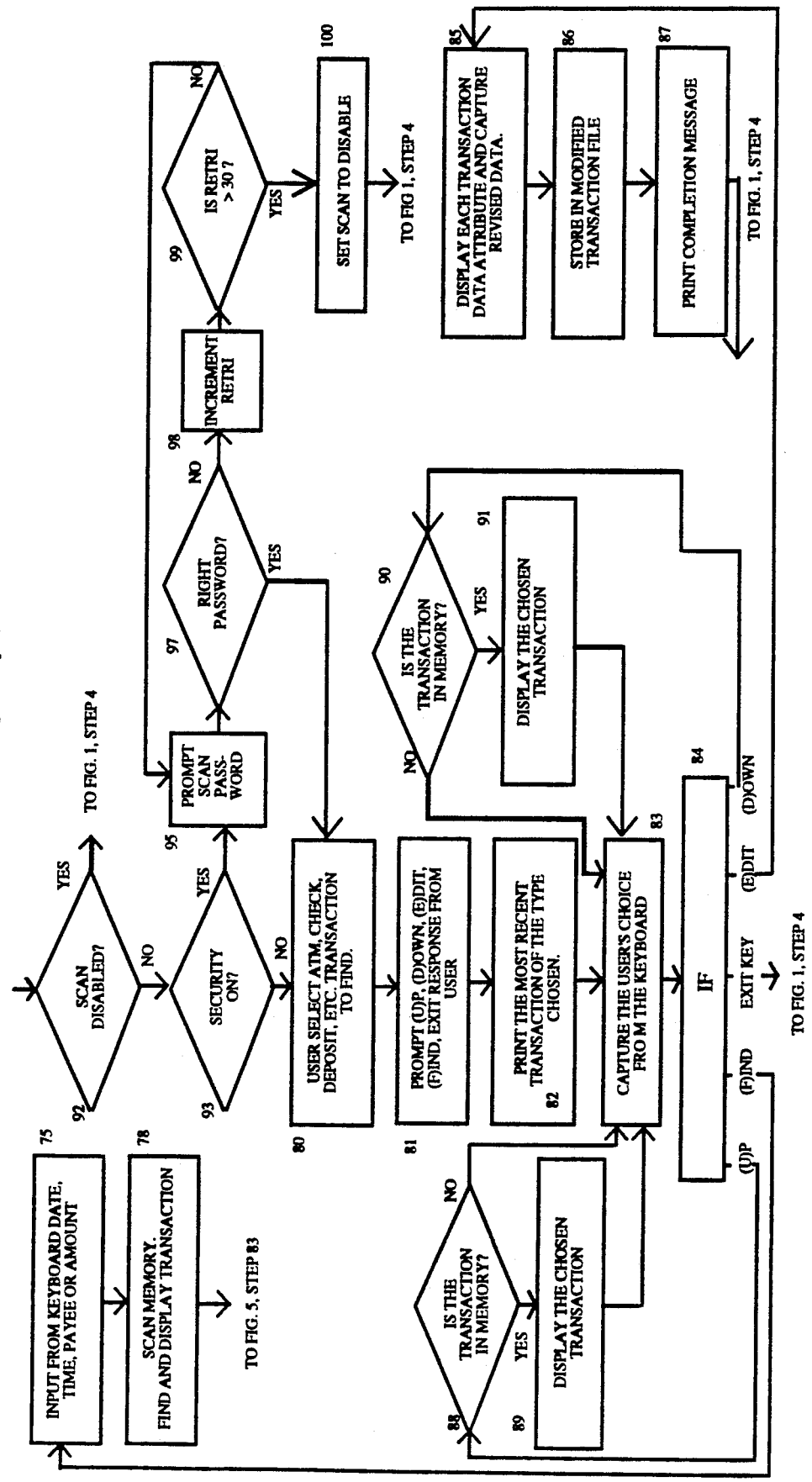
FIG. 5 illustrates a system for user scan of all transactions by transaction type.

When the transaction scan and edit option is chosen from FIG. 1, step 4, FIG. 5, step 92 checks memory to see if scan is still permissioned. If the maximum number of access failures have already been exceeded (FIG. 5, step 99), then the ECR is routed to function selection (FIG. 1, step 4). If step 92 is negative, step 93 checks a memory variable to see if the user has opted for the "Invisible Check Register" option for security/privacy. If so, the display prompts in of password which is compared to the one entered in FIG. 1, step 2 (there may be two passwords entered here, where desirable, one for host identification and the other for data security).

If step 97 is negative, then the user is allowed to try again up to the point where the bank's choice of retry ceiling number (thirty used here for illustration) is reached. When this occurs the scan variable is reset to disable value, the ECR routed to function selection and subsequent attempts to scan transactions will be refused. Also, when variables are uploaded to the ABC host at reconciliation, the tampering will be sensed, thereby allowing the bank to respond accordingly. To re-enable the Electronic Check Register, the user must return to the bank, where an unlocking variable is entered which resets scan to enable and RETRI# to 0.

Figure 6:
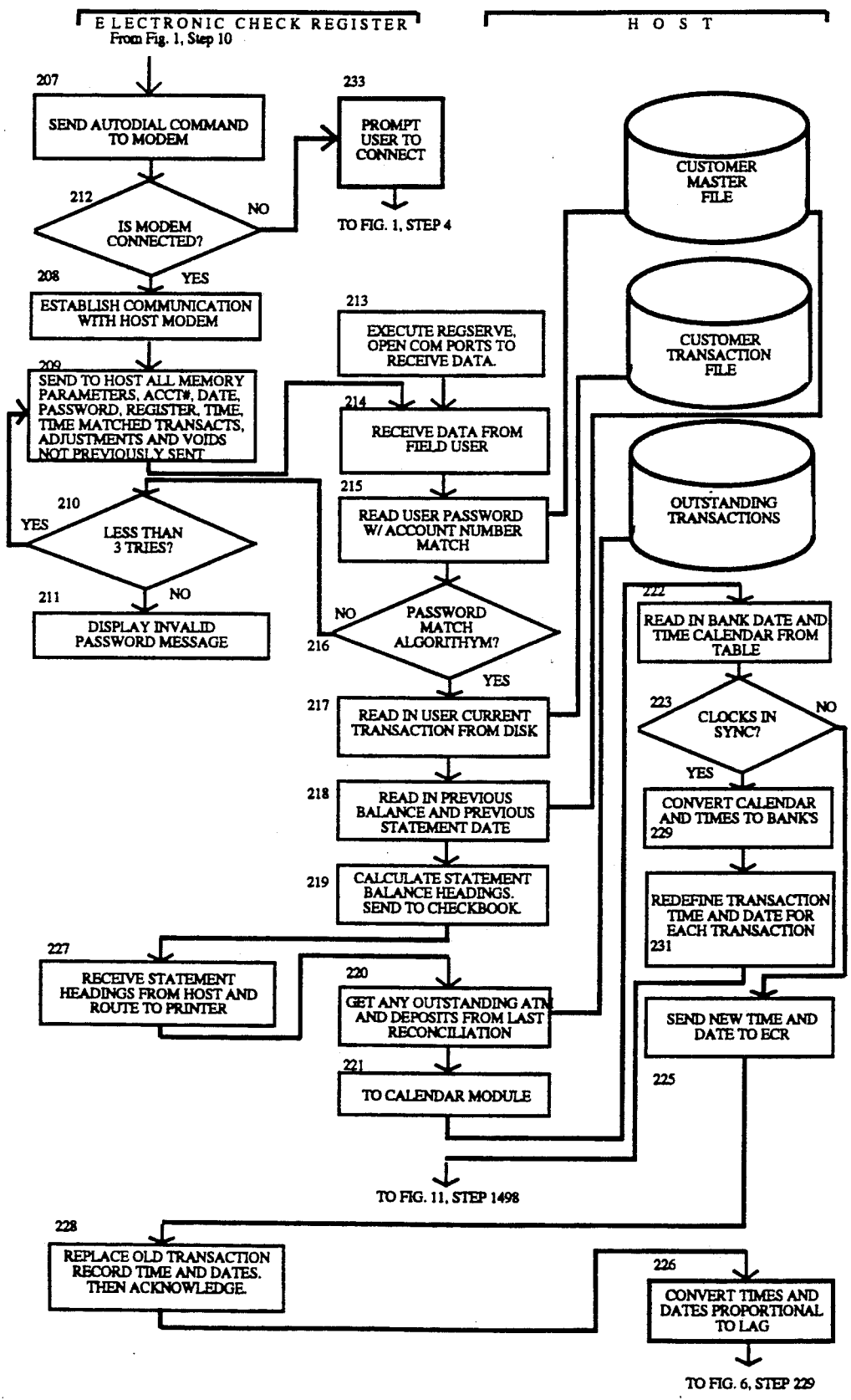
FIG. 6 illustrates automatic reconciliation with the bank, statement generation, error correction and clock/calendar transaction auto-synchronization/date remapping.

If the numbers do match, the scan is enabled and the user is prompted to enter the type of transaction desired (FIG. 5, Step 80) followed by the instructions in Step 81 to use a U to go (U)p to all the transacations, a D to go back (D)own to the more recent transactions, an F to (F)ind a transaction (automatic search), or an E to (E)xit the scan and automatically enter the edit mode to correct transactions. Upon response to the prompt, step 79 senses if the user selected (F)ind and, if so, takes transaction identification data in FIG. 5, step 75 and then scans and displays the most recent transaction of the type selected that fits the criteria It then awaits the user's further instructions in FIG. 5, step 83. If the (F)ind key is again depressed, the next youngest transaction, if any, to fit the criteria is displayed. This can be repeated as long as there are more transactions to look at. When there are no more, the last one displayed, if any, remains until another selection is made (FIG. 6, step 84).

Should step 79 be negative, the most recent transaction of the type chosen is displayed and a choice from the keyboard is awaited to route the display (U)p to older transactions or (D)own to more recent transactions (84). Step 84 also accepts inquiry to exit to function selection FIG. 1, step 4, as well as to edit and store the current transaction displayed (FIG. 5, steps 85-87) followed by return to function selection.

Auto Reconciliation

When the user opts for auto-reconciliation, the user first connects the Electronic Checkbook Register to the communications module, which is already connected to the telephone. The user then selects Reconciliation from Function Selection in FIG. 1, step 4. If the model being used has the communications module with modem permanently attached, the user plugs it directly into a telephone line prior to selecting the Reconciliation option.

After selection of reconciliation, the ECR sends, at FIG. 6, step 207, an auto-dial command to the modem. (If the user fails to make the proper physical connection prior to selection of reconciliation (FIG. 65, step 212), an error message is displayed on the ECR screen (FIG. 6, step 233), followed by return to Function Selection FIG. 1, step 4.

Assuming good connection, the host answers, followed by establishment of communication with the host modem in 208. After completion of hand-shaking procedures, the Electronic Check Register sends the host all its memory parameters used in memory control, tamper recording variable, the user's account number, password (bank may opt to require the user to key in his password manually prior to reconciling in step FIG. 6, step 206), security number, current date and time (from the clock and calendar module), followed by the time matched transactions, adjustments and void entries that have not been previously sent to the host. The host receives the data (FIG. 6, step 214) and then reads in from the customer master file (FIG. 6, step 215) the appropriate records for the account number sent, followed by a comparison of the result of the security, account number, and password algorithm and, passing that algorhithm in 216, proceeds to read from disk the customer transaction files for the approved user.

Should the password, account number, or security number algorithm fail, then it is attempted twice again in FIG. 6, steps 210 and 209 as these steps attempt to resend the entire record (if error checking protocols have failed, the data should be resent for security reasons). Should it pass too many tries in FIG. 6, step 210, then an invalid password message is displayed and the user is forwarded to FIG. 1, step 4 to continue his session.

For the validated user, the hose continues, at FIG. 6, steps 217 and 218, by reading in the user's current transactions and previous statement date from the bank's host system. It then proceeds to calculate (FIG. 6, step 219) the statement balance headings to forward on to the Electronic Check Register via modem, which headings will then be printed as part of a normal statement (see (Appendix A). (The printer option is illustrated here for convenience. It prints a statement while balancing the account decreasing the on line time required. Those users not opting to use printers or other large display devices will, rather than receive all the statement messages, receive only the error prompts for similar resolution, or the more desirable successful balance validation number, indicating that everything is in balance.)

The Electronic Check Register and integrated host system automatically minimize the memory requirements of the Electronic Check Register by passing outstanding transaction files to the bank's disk after each successful reconciliation Therefore at this point in a reconciliation process (FIG. 6, step 220) the host reads in any outstanding transactions from the previous reconciliation, even if that occured on the previous day. The host system then proceeds to its own calendar module, where it reads in its own bank date and time calendar as well the current time (FIG. 6, step 222). At this point a test in the time synchronization of the two systems is performed. Should the time sent from the Electronic Check Register (as adjusted up for the time that has passed since that time was transmitted, based on the bank host clock time recorded upon receipt) differ beyond the minimum tolerance as tested in step 223, then a new time and date is sent to the ECR (225). The ECR then replaces previous time and date with this new time and date, automatically resetting and resynchronizing the two systems. The ABC host's logic then automatically converts the times for the transactions from the ECR's memory to the accurate times, based on the calculated slowness or fastness of the clock (which is calculated by the difference in the times of the two clocks over the time since the last reconciliation which is read from the customer's master file in F218). A new time and date matched transaction image for each transaction is thereby created to complete the first step in autosynchronization transaction processing.

After the transaction times have been corrected, if necessary, the host system continues the automatic transaction data conversion for synchronization (FIG. 6, step 229) by converting the true chronological times rendered by the ECR to true bank calendar times. For example, a chronological time of 2:01 P.M. on Friday is converted to the following Monday morning business day, unless that Monday is on the holiday table for that month. The bank host calendar includes a table of holidays and banking hours and so redefines the transaction times and date in each transaction (FIG. 6, step 231). The ABC system is thereby able to repair the separate but parallel bank and check register data capture system's out of sync condition and then automatically reconstruct transaction histories (both in time correction and business day correction) to a truly synchronized record. This ability helps minimize user intervention, facilitated by the ABC system's ability to match the two record source transactions.

Deposit Reconciliation

Figure 11:
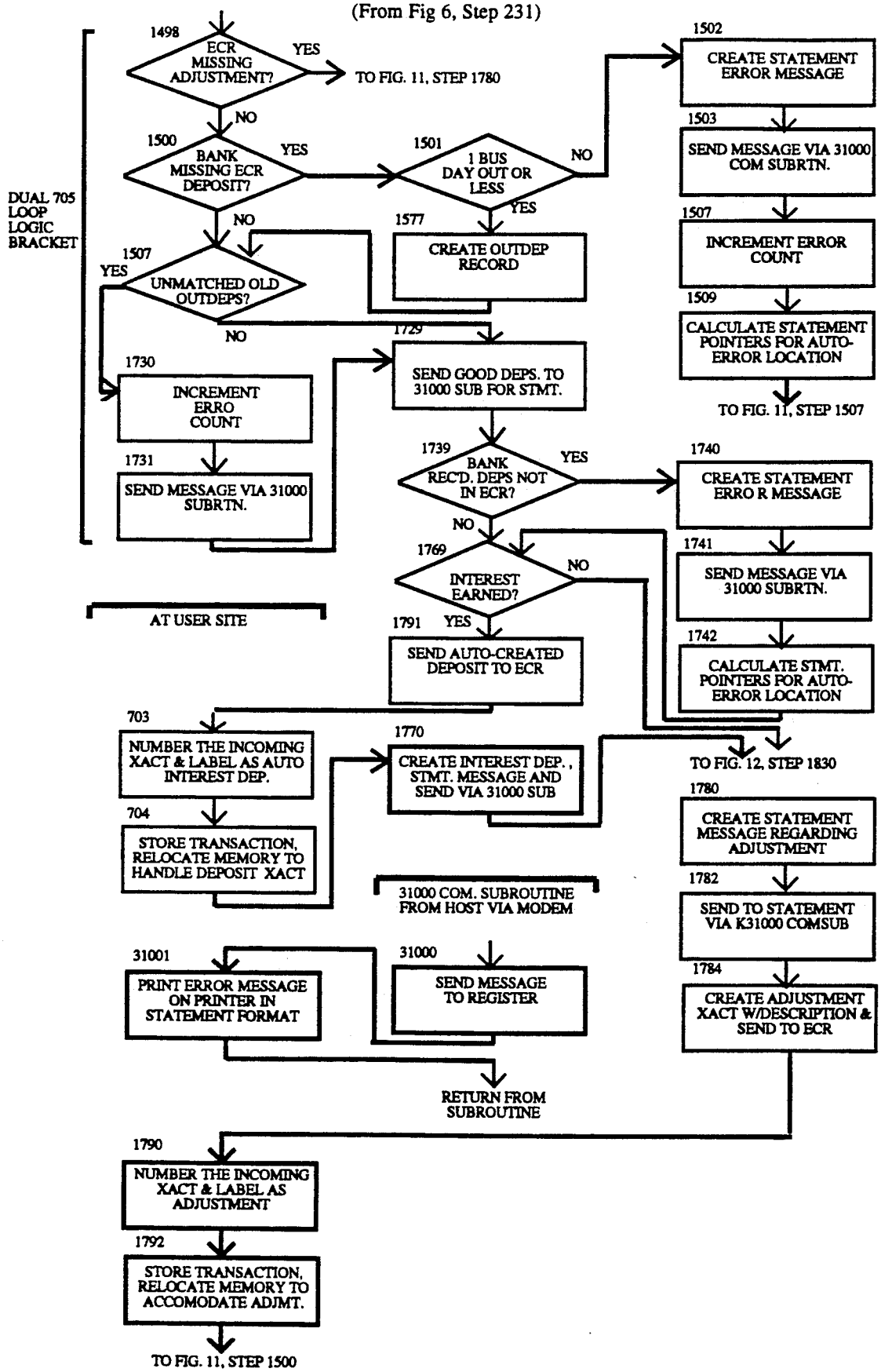
FIG. 11 illustrates the method of reconciliation error capture.

With the transaction records now synchronized, the host system proceeds to FIG. 11, step 1498, which begins a loop (found on the chart described by loop logic bracket 705). The loop actually comprises a series of cycles in which each source's transaction capture list is compared with the other, looking for unmatched transactions, dates or amounts on either side. Test K1498 itself compares for an adjustment transaction present in the host data but not found in the Electronic Check Register transmitted data. If a mismatch is found, a statement transaction and message is created (documenting the adjustment and the fact that it has been automatically entered into the Electronic Check Register in FIG. 11, steps 1780 and 1782). This is followed by the creation of a full adjustment transaction image sent to the ECR, numbered and stored there (FIG. 11, steps 1784-1792).

FIG. 11, step 1500 deals with the eventuality of the ECR sending a deposit that the bank has not received. If the deposit is over one business day old (as tested in FIG. 11, step 1501) then an error message (created in FIG. 11, step 1502) is, if the statement option is being used, printed via the FIG. 11, step 31000 communication sub-routine. This sub-routine simply sends a message over the same dial-up telephone line to the ECR, where it is handed off to the printer. The host maintained error count is then incremented. In FIG. 11, step 1509, statement pointers for automatic error location in the comparative listing (which is provided as supplementary information at the bottom of the statement) are calculated and saved until that part of the statement is at hand. Should step 1501 be positive, an outstanding deposit record is created for later disc storage and the next Test, FIG. 11, step 1507, ensues. FIG. 11, step 1507 considers any outstanding deposit from the previous reconciliation that has not resulted in a transit capture deposit at the bank (assuming that a bank day has passed since that previous reconciliation). If such an old outstanding deposit has, in fact, failed to come in, the error count is incremented (FIG. 11, step 1730) and an error message is sent to be printed on the statement.

Whether or not errors have been found, the host proceeds, for statement receiving users, to send (FIG. 11, step 1729) the records of all good deposits received by the bank. This results in an ordinary readable statement, with an error message next to errors for easy visual understanding. If the bank records a deposit that the Electronic Check Register does not show (step 1739), then in step 1740 an error message is created and sent to be printed on the statement. Statement pointers are then calculated for later use in a supplementary list-out (FIG. 11, step 1742).

ABC Banking also automatically enters certain credits, including interest earned and dividends paid, into the ECR for the user as part of the reconciliation process. The need for the user to enter such transactions is thereby eliminated, as shown in FIG. 11, step 1769. The ECR then, in step 703, automatically numbers and labels the incoming deposits, reallocates memory necessary and stores the transaction in 704. This is followed by the host's automatic creation of an interest deposit statement message (FIG. 11, step 1770), to be printed on the paper statement by the 31000 subroutine.

Check Reconciliation

The host reads in any outstanding checks from its outstanding check files generated during the previous reconciliation (this is shown in FIG. 12, step 1830). As a matter of statement printing housekeeping for statement receiving users, the check transaction heading is then sent to the printer. FIG. 12, step 1869 calculates the lowest transaction number from both sources, and, beginning with the lowest number, enters a loop, defined by steps 1979 and 2139, in which all checks from each source are compared by number and amount.

In FIG. 12, step 1979 the host automatically ascertains if the check register s transactions have become out of sync (one of the most frequent check writing errors). This is sensed by scanning comparative identical error offsets, as described above. When this error is identified (FIG. 12, step 2009), an error message is created for display on the printer statement along with a message to the user giving him the option of striking a single key and having all the erroneous transactions with mismatched transaction numbers corrected automatically and restored in his ECR or returning to FIG. 1, step 2009, where he can opt to scan and edit the transactions manually. If the user chooses auto correction in FIG. 12, step 2038, the host sends revised check images to the ECR, where they accepted at face value and replace the old records (FIG. 12, step 2037).

The host and ECR then proceed back to their initial correspondence in FIG. 6, steps 213 and 209, respectively. The transmission and reconciliation process is repeated with corrected data and verifies that all corrections were received intact. Otherwise, should the user choose to correct manually, the communication is disconnected (FIG. 12, step 2035) and the ECR will automatically return to function selection and the host will return to its pre-answering posture (FIG. 6, step 213).

Should the checks not be out of sequence (which will generally be the case, especially since the check numbers are monitored and calculated by the ECR and a verification of the user is obtained each time a transaction is made), then the ABC host proceeds to FIG. 12, step 2070 (this automatic sequence correction function is unlikely to be used frequently except by the most careless of users). If this test finds that a check was received by the bank but is not among those sent by the check register, an error message is incremented. This results in the creation of a statement pointer (for automatic error location in the Supplementary Information Listout printed below the statement, which shows a full listing of both sets of records with the statement pointers creating arrows next to mismatches for easy location of discrepancies). It also ultimately results in the creation and delivery to the statement of an error message in FIG. 11, steps 2071-2074. This error message, however, does not end the statement rendering process, since the format is designed to make the statement as simplified and comprehensible as possible. Therefore, if there is a register omitted check, then the next transaction number is considered following test FIG. 12, step 2138.

If both sources do not show the transaction (which at this point in the logic stream means that the ECR shows a transaction that the bank's transit has not received, FIG. 12, step 2079), then the host creates an outstanding check record in FIG. 12, step 2080. As deposit reconciliation above, the good transactions received by the bank are all displayed, along with the errors, so that a simple statement with highlighted errors results. After the bank's version of the check has been printed on the statement, a test is made in FIG. 12, step 2119 to see if this transaction (whose records exist in both files) has the same amount in both records. If it does not, then the error count is incremented, statement pointers are calculated, and the error message is sent to the printer, where the error message will occur just below the actual transit received check image on the statement. If there are more transactions not yet considered, then FIG. 12, step 2138 proceeds to the next transaction in FIG. 12, step 1979. However, if all transactions have been considered, it proceeds to FIG. 14, step 2170.

Figure 14:
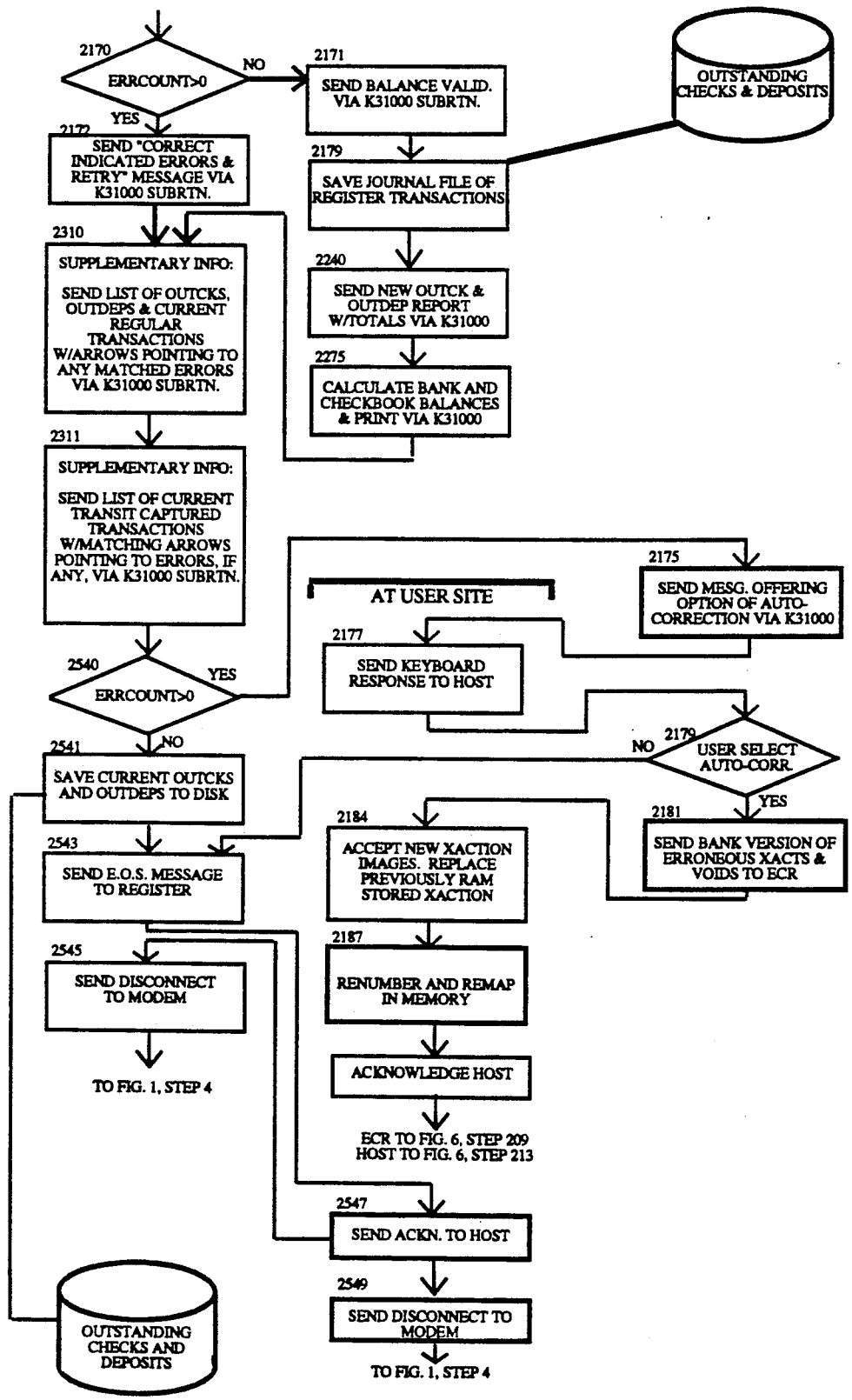
FIG. 14 illustrates the process of autoreconciliation continued from FIG. 12.

If there are no errors (as indicated by an error count of zero, as shown in FIG. 14, step 2170, then the host proceeds in FIG. 14, step 2171 to send an authorized validation number verifying the ECR's accuracy on current transactions. This is followed by saving of all transaction records on journal file (FIG. 14, step 2179), preparing and sending a listing of outstanding deposits and withdrawals with totals for recordkeeping and future use (FIG. 14, step 2240), as well as relative balances (FIG. 14, step 2275) for statement printing.

At this point all the deposits and checks from both information sources have been compared and a statement has been printed from the bank point of view (just like an ordinary bank statement, with error messages, where applicable). In most cases where an error exists, the simple observation of, for example, check number 104 with a note below it saying it should have been for another amount, is all that is necessary to see the problem. However, it is helpful to provide a supplementary information listing showing exactly what the checkbook shows and a listing of the transactions which the bank shows. Payee and purpose information is shown alongside each, to make those transactions (written by the user) all the more familiar and simple to understand. It then proceeds to print out supplementary listings showing first the chronological listing of the Electronic Check Register's transaction file (preceeded by previous outstandings that were received by the bank this cycle, for easy comparison) and then the bank's listing. Both listings show full payee and purpose of payment information, for ease of comparison and the user's personal recordkeeping.

Host Automatic Correction of Full Statement and Electronic Check Register

If ERRCOUNT is positive, then the supplementary listing above (FIG. 14, steps 2310-2311) includes additional arrows in the margins pointing to the bank version and the ECR version of the matched but conflicting transactions. This provides a second view of where the difference lies. Providing more than one arrow font makes it possible to have more than one error and still distinctly document error pairs. After the supplementary listing, if in FIG. 14, step 2540 ERRCOUNT>0, then the user is given the option of ABC host complete automatic correction of all errors shown on the statement. The user, utilizing the keyboard (FIG. 14, step 2177), may opt to accept the bank's version of the already noted transaction differences. Then in FIG. 14, step 2181, for non-outstanding Electronic Check Register transmitted deposits (or other transmitted transactions not tracked by a specific transaction number, considered below) that the host has not received, the host sends void transaction images to the ECR to delete any such non-outstanding transactions. (Deposits, for example, are only considered outstanding for one business day. After that they are considered errors). The host also, in FIG. 14, step 2181, sends a new transaction image for any such unnumbered transaction which the ABC host has received but which is not shown in the ECR transmitted transactions.

In addition to correcting such missing or extra transactions, the process above replaces unmatched transaction images where date or amount differences exist, since a difference in these criteria results in "no match". For example, an ECR deposit with a date of January 11 and a bank host date of January 12 for the same transaction (assuming the error wasn't time of day, which would have already been corrected in the first clock synchronizing encounter described above), then in FIG. 14, steps 2181 and 2187 the ECR item would be erased with a host created and transmitted void transaction and replaced with the "new" image which would, in fact, be the same transaction with the correct date.

Figure 8:
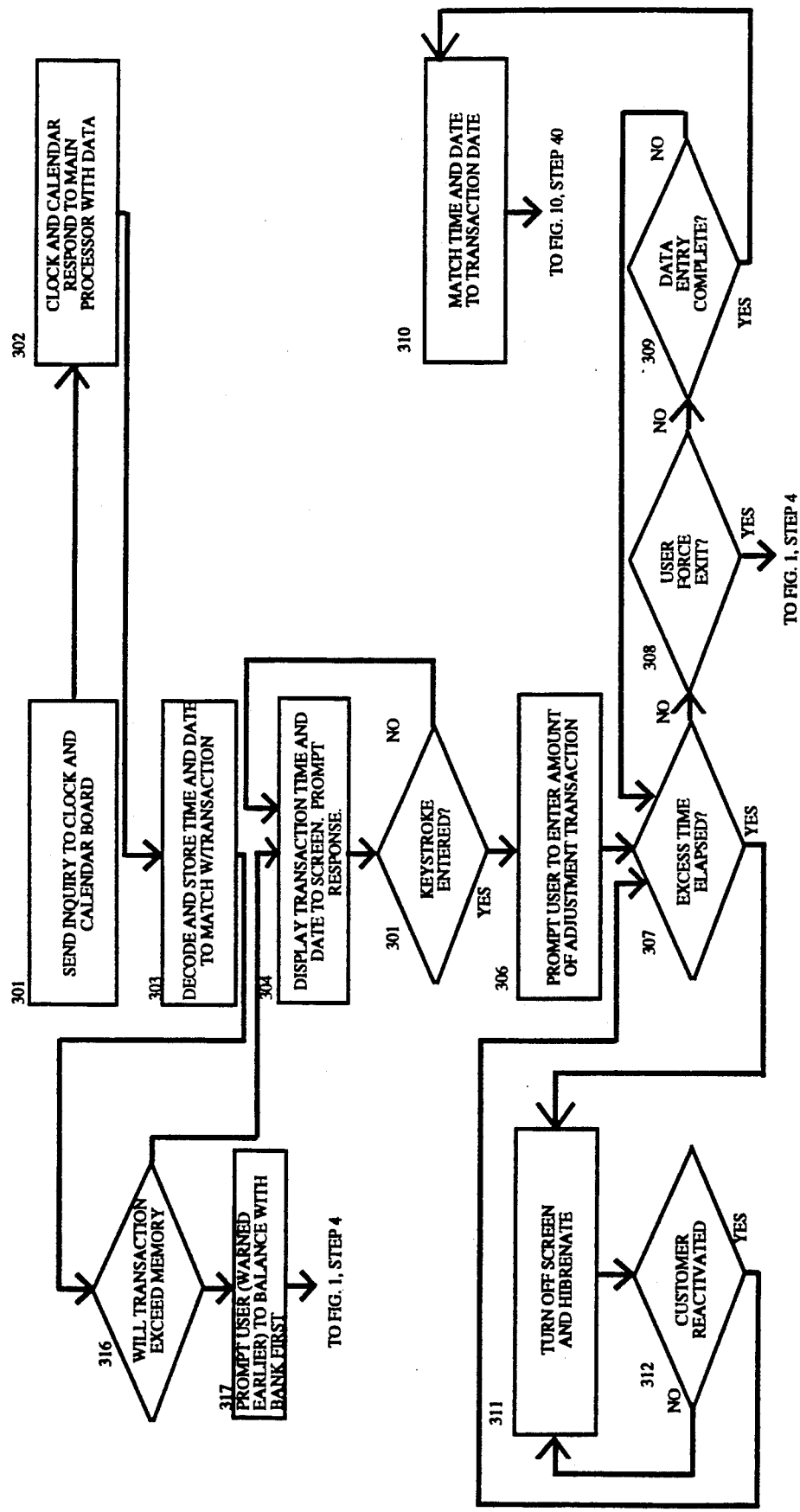
FIG. 8 illustrates the entry and capture of adjustment transactions.

Similarly, for each check or other numbered transaction, the ABC host creates a new transaction image faithful to the item received at the bank and sends it to the ECR (FIG. 14, step 2181) for any such transaction that the ABC host received but the ECR did not show. However, for any transaction numbered item shown on the ECR and not received by the ABC host, no message is sent, since this has already been identified as outstanding. Also, for numbered transactions, if both capture sources show that the amount conflicts, the new transaction image sent by the host in FIG. 14, step 2181 differs in amount only, leaving the user entered Payee and Purpose information as originally entered. However, should the host receive a check in transit or other host data capture that is lower than the lowest ECR check number or higher than the highest check number (and therefore was not entered by the user into the ECR), it will not send the check to the Electronic Check Register since it is a violation of check sequencing and a possible fraudulent item. In this case the item, already identified as missing, will remain as an unmatched transaction (even on the statement that automatically follows automatic balancing and otherwise shows a balance verifying validation number). Although all other corrections will be made automatically (FIG. 14, steps 2181 and 2187), the account will remain out of balance by the amount of the transaction, and will be identified as such on the statement, until the user responds to the statement messages in FIG. 12, step 2074 to contact the bank. The transaction will then be voided or an adjustment will be made, taking advantage of procedures for adjustment items illustrated in summary in FIG. 8 and described elsewhere herein.

The Electronic Check Register accepts the new void and replacement transactions (FIG. 14, step 2184) and remaps memory to accommodate new transactions that require additional memory in FIG. 14, step 2187, followed by acknowledgement to the host of receipt. Then, to begin statement reprinting with a clean slate and to verify that the changes were received and stored intact, the ECR proceeds to FIG. 6, step 209 and the host to FIG. 6, step 213. The new Electronic Check Register data, memory parameters, etc. are transmitted and the host begins balancing all over with the new data after resetting its own transaction, error and other counters and function variables.

After any necessary automatic corrections or, if the user prefers, manual corrections, the successful autobalancing session continues with closing housekeeping from the then negative Test step 2540 of FIG. 14 and directs the saving on disk of the current new outstanding transactions. The end of session message is then sent to the check register in FIG. 14, step 2533, followed by the ECR's acknowledgement, and the two systems say goodnight in FIG. 14, steps 2549 and 2545. The host returns to its initial execution state (all memory variables cleared) and the ECR returns to the function key option selection in FIG. 1, step 4.

Capture Adjustment Transaction

For rare occasions when it is not appropriate for the bank to correct a bank initiated error by a voided and/or replaced transaction, the ABC system provides the ability for the bank to automatically enter an adjustment and transmit that adjustment to the checkbook for automatic entry (as summarized under auto-reconciliation). It is also possible, if the bank chooses to allow it, for the user himself (upon agreement with the bank that an adjustment is necessary and that the bank will make the same adjustment at their end) to enter the adjustment manually to the ECR keyboard.

Following the appropriate function selection from FIG. 1, step 4 the ECR sends an inquiry to the clock and calendar module (FIG. 8, step 301) and receives (FIG. 8, step 303) the time and date, which it decodes and stores to later match with the completed transaction. As with any new transaction, the ECR automatically checks (FIG. 8, step 316) to be sure that memory exists to continue to store this transaction upon completion. If it does not, then the user (who has earlier been prompted to balance with the bank because transaction memory was running low) is directed to balance with the bank prior to entering this adjustment. Otherwise, it continues (in FIG. 8, step 304) to display the transaction time and date to the screen and to prompt the user to respond and continue with any keystroke. Receiving same, the ECR prompts the user to enter the amount of the adjustment transaction (in FIG. 8, step 306) and then enters a memory and battery cycle in steps 307, 308, 309, 311 and 312, which turns off the screen (in 311) if excess time has elapsed (in 307). If (in FIG. 8, step 308) the user forces an exit, it returns to the function selection menu in FIG. 1, step 4. Step 309 senses when the data entry is complete. If it does not sense data entry completion, it returns step 307 to begin the loop verifying time out criteria, user force it, etc. If the data is complete, the ECR (in FIG. 8, step 310) matches the time and date to the transaction data and forwards the transaction to the revolving transaction module (in FIG. 10, step 40), as described above for other transactions. As above, the revolving transaction management system completes the function with the storing of the adjustment transaction.

Modify Check Number Sequencing

From the time the user opens his account, usually with check number 0001, until the time he achieves check number 9999, it is unnecessary for any modification to be made to the check number sequencing. However, for those situations where checks are lost or the customer writes 10,000 or more checks, the ABC system provides an option from FIG. 1, step 4 to automatically reset all its memory parameters and check number calculation variables by request from function selection, FIG. 1, step 4. When this option is chosen from FIG. 1, step 4 the procedure proceeds to FIG. 9, step 59000, where it is determined whether or not reconciliation was the last transaction. If not, the message is displayed on the ECR screen in FIG. 9, step 59010 prompting the user to reconcile first.

Figure 9:
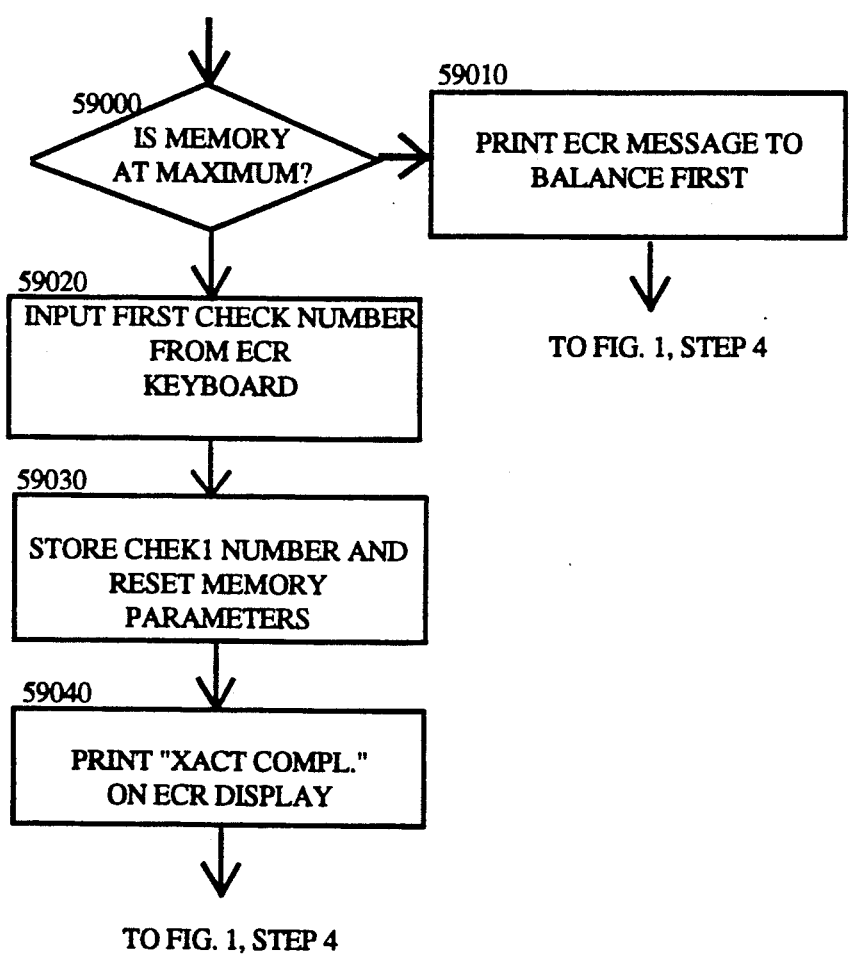
FIG. 9 illustrates a process the Electronic Check Register may use to modify checknumber sequencing when that is desirable.

Reconciliation is required just prior to modifying the entire check number sequencing scheme as a housekeeping measure and a memory maximizing measure. If reconciliation has just been performed, the screen prompts the user to input, from the electronic keyboard, the check number of the new sequence he intends to use (FIG. 9, step 59020). The entered check number is then stored and used to reset its variables for check number calculations and then reset all memory parameters for future transactions in FIG. 9, step 59030. The ECR display then shows "transaction completed" and the ECR is returned to FIG. 1, step 4 function selection main menu.

See Reports On Transactions

The ABC system also has the ability to provide reports on the automatically captured full transaction image originally captured in the ECR and then stored at the host site. These reports may comprise, for example, chronological reports by payee or a complete listing of check numbers X through Y, regardless of posting date. It is also possible for the user to designate a payee to a certain category and then receive reports back on either that payee or all other payees in that category; i.e., a category report.

Figure 13:
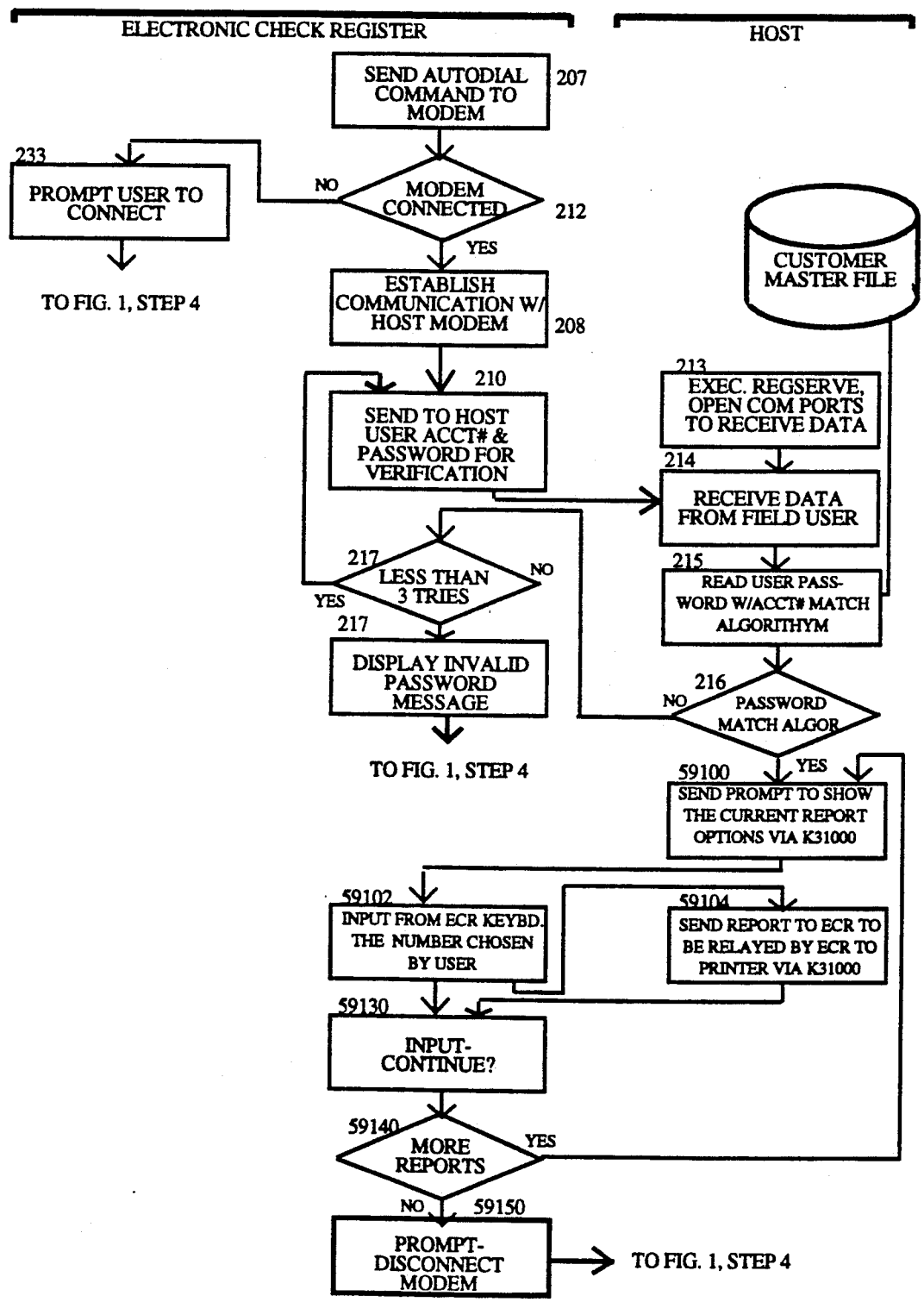
FIG. 13 illustrates the process of displaying reports.

To do this the user selects, from function key selection in FIG. 1, step 4, "Reports On Transaction", whereupon the system automatically dials the host and establishes communication (FIG. 13, steps 207 and 208, assuming the modem and ECR are well connected to the phone line and receive a carrier in FIG. 13, step 212). This is followed by the automatic uploading of password and account number in FIG. 13, step 210 (security number is attached to the back of the account number), which are then received and verified by the host in FIG. 13, steps 214, 215 and 216, with retries upon failure directed from FIG. 13, step 217. Upon passing the security checks, the host sends the exact text of an available options prompt to be printed out (FIG. 13, step 59100). The ECR then receives at its keyboard the user's choice (FIG. 13, step 59102), and the ECR dispatches this choice over the same existing modem line to the host. The host, in FIG. 13, step 59104, sends back the exact text of the report desired, which is simply relayed to the printer by the ECR interface. FIG. 13, steps 59130 and 59140 allow the repetition of the process.

Full Financial Relationship Transaction Accounting & Reporting

Many kinds of transaction data can be captured in the ECR and automatically reconciled and reported. Telephone bill payment, credit card payment, etc. transactions can be integrated into the same ABC system, allowing the user to key into the ECR any kind of transaction associated with the bank or other entity providing the service. The transactions may be both reconciled and reported within the ABC system like any other credits or debits, with the ABC host also receiving the new transaction types either on line or in batch or other forms in addition to the ECR supplied data. This provides a pocket portable capture vehicle that can literally keep up with, consolidate and reconcile all the user's financial transaction relationships with a single financial institution and/or other cooperating institutions.

Although non-checking transactions can be automatically matched by time and date, just as checking deposits are, checking deposits have the advantage of being between two unique parties. Non-checking transactions can involve many merchants, etc. As a result, one additional number can be optionally captured along with the other transaction information captured on the ECR. Although there are many such numbers that could be used, the merchant number (or last four characters thereof) for checking account debit card transactions is illustrated here. Already captured by the card transaction processors and sent to the bank of issue as a normal procedure, this number is also entered and stored in the ECR by the user to be matched with the other transaction data (Payee, Purpose, Amount and Date) and at the host (which has already received the merchant transaction tagged by the account number) along with the merchant number and transaction amount. Although it is obvious that other tracking data could be added to help automatically match transactions, and such additional procedures are obvious to those experienced in the banking systems field, it is not necessary, since the ABC system autoreconciles these items in the same manner as deposits (i.e. it scans to match items and identify missing items from either source, except that they are batched by merchant number first prior to date and amount cross matching).

The host system, which may be receiving its on line information through a third party processor or service provider, then has an ECR synchronized transaction record for each such transaction. The host can autoreconcile and report these transactions at the same time the rest of the user's financial relationships are reconciled into one financial net account.

Transaction matching for on line transactions can also be accomplished by host generated transaction numbers transmitted to the point of sale being keyed in to the ECR, or by matching of Payee data in the ECR to the merchant identity captured at the point of sale, or by ECR generated transaction numbers being copied from the ECR display into the point of sale terminal. Other means of data capture for transmission to the host may be employed which, like check number, increment up by one for each transaction but which are kept separate from check transactions by transaction type or simply by time matching transactions to prevent transaction number conflicts. Most on line capture systems already capture time of transaction at the host. However, these and other natural extensions and variations on the ABC system are obvious to those experienced in the banking systems field and are not further explained herein.

ECR Live Terminal Bill Payment

The ECR can also be used in the truly interactive report mode described above to pay bills or make payments directly to the host from the ECR keyboard (and, of course, from the host to the ultimate payee, as is typical of terminal bill payment systems). However, while making the payments as an ordinary "dumb terminal", the ECR also automatically captures the Bill Payment as a debit transaction, just like the check transactions (but with a separate series of transaction numbers to prevent transaction number overlap). The transaction may be immediately entered into the Electronic Check Register, adjusting the ECR balance and then may be autoreconciled with all other transactions at any time.

Figure 15:
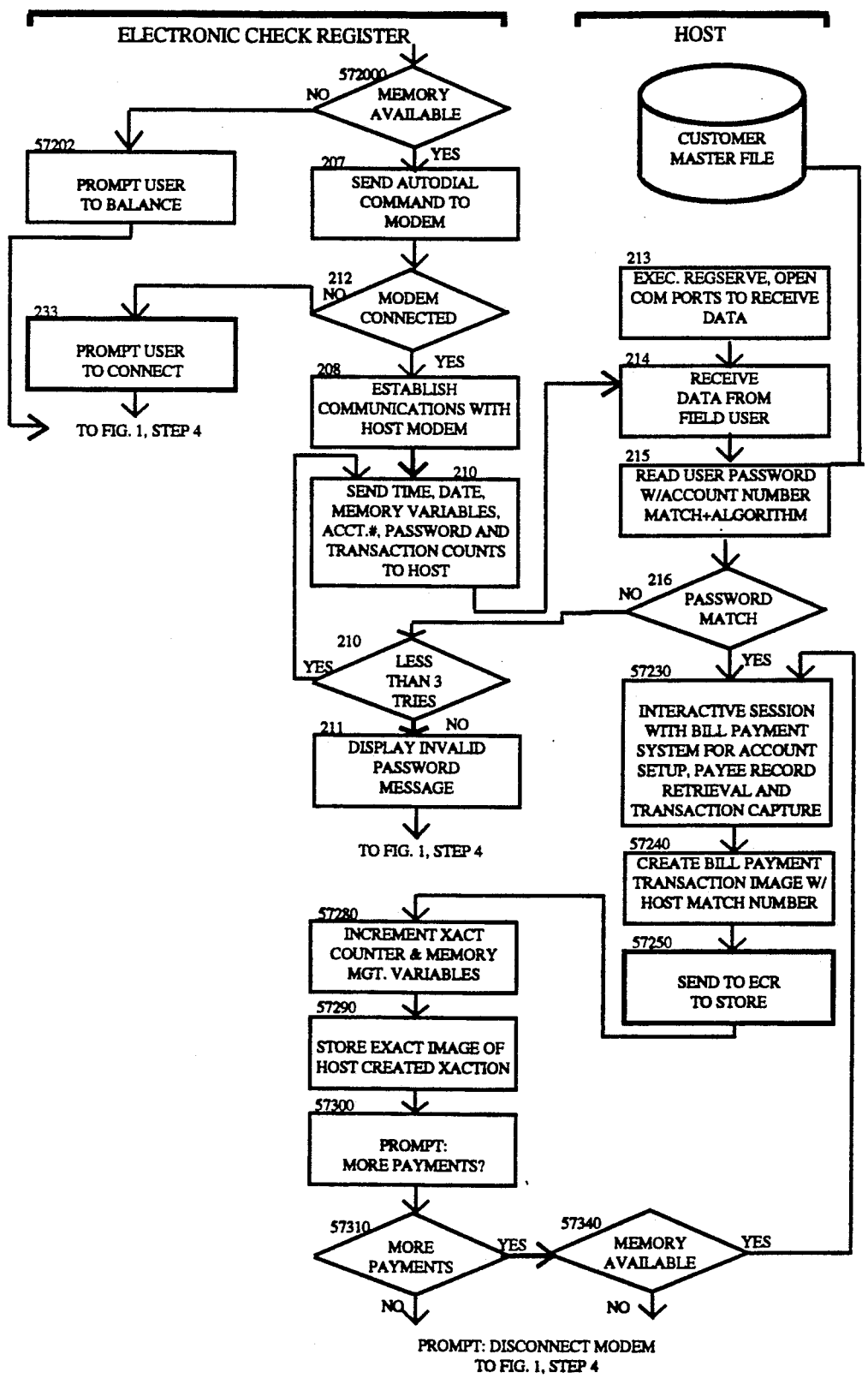
FIG. 15 illustrates the process of electronic bill payment with automatic register capture.

To do so, the user selects from function key selection of FIG. 1, step 4, the step 15, Electronic Bill Payment. The ECR then verifies that there is memory for transaction in FIG. 15, step 572000, prompting the user to balance if memory is not available. Continuing on, the modem is auto dialed and connection established. In FIG. 15, step 210 the time, date, memory variables, account number, password and transaction counts are sent to the host. The password and account number are tested against an algorithm and, if approved (in FIG. 15, step 216), an interactive session with the bill payment system begins where the user sees questions either on his printer or on his ECR display (depending on which option he has chosen) and responds with the host to set up new payee records, retrieve payee information and request payments (as is typically done today with terminal bill payment). However, the host then creates a transaction matching number (FIG. 15, step 57240) which is sent to the ECR along with a complete image of the now completed bill payment. (It is also possible for the ECR to generate the transaction number and send it to the host instead).

Back at the Electronic Check Register, the transaction count and memory variables are incremented and the image of the host created transaction with the matching transaction number are stored (FIG. 15, step 57290). That transaction number will be used as part of the normal balancing process (like check numbers) to match off bill payments within the check reconciliation process in a single transaction account and report structure. Payee information and other reports are also integrated, making the ABC system an effective manager for a broader range of financial transactions, all automatically reconciled and reported within one structure. Should more bill payments be desired, after steps 57310 and 57340 verify the need and availability therefore, the interactive session is continued with the host bill payment system.

The above described arrangement is merely illustrative of the principles of the present invention. Numerous modification and adaptations will be readily apparent to those skilled in the art without departing from the spirit and scope of the present invention.

What is claimed is:

1. A device for monitoring and processing checking account transactions, comprising:
   first processing means for storing a first set of data corresponding to checking account information;

second processing means for storing a second set of data corresponding to said checking account transaction information;

first communication means for electronically communicating said first set of data, from said first processing means to said second processing means in substantially real time;

comparison means operatively connected to receive said first set of data and said second set of data for electronically comparing said first set of data and said second set of data;

electronic and automatic discrepancy identification means responsive to said comparison means for electronically and automatically identifying discrepancies between said first set of data and said second set of data;

second communication means for communicating data, including said identified discrepancies, from said discrepancy identification means to said first processing means;

electronic and automatic display means associated with said first processing means for electronically and automatically displaying said identified discrepancies; and electronic and automatic editing means associated with said first processing means for electronically and automatically revising said first set of data to conform to said second set of data, electronic validation means operatively connected to comparison means and first and second communication means for giving the user an authorized validation message when the account is reconciled.

2. A device as in claim 1 further comprising:
manual entry means associated with said first processing means for manually entering into said first processing means data corresponding to the amount of each of said checking account transactions for use by the discrepancy identification means and for storage in the first processing means.

3. A device as in claim 1 further comprising:
a manual entry means associated with said first processing means for manually entering into said first processing means data corresponding to the payee of each of said checking account transactions for use by the discrepancy identification means and for storage in the first processing means.

4. A device as in claim 1, further comprising:
clock means associated with said first processing means for generating data identifying the time and date that each of said checking account transactions is entered into said first processing means for use by the discrepancy identification means and for storage in the first processing means.

5. A device as claimed in claim 1, further comprising:
manual entry means associated with the first processing means for manually entering into the first processing means data corresponding to the amount of each checking account transaction;
wherein the first set of data stored by the first processing means includes data enterable with the manual entry means.

6. A device as claimed in claim 1, further comprising:
manual entry means associated with the first processing means for manually entering into the first processing means data corresponding to the payee of each checking account transaction;
wherein the first set of data stored by the first processing means includes data enterable with the manual entry means.

7. A device as claimed in claim 1, further comprising:
a clock associated with the first processing means for generating data identifying the time and date that each of the checking account transactions is entered into the first processing means;
wherein the first set of data stored by the first processing means includes data generated by the clock.

8. A device as in claim 1, further comprising:
audit trail creation and reporting means operatively connected to first and second processing means and first and second communication means providing electronic and automatic creation of complete historical audit trail data allowing the user to see a complete history of what changes were made to his account.

9. A system as claimed in claim 1, further comprising:
transaction loss prevention means operatively connected to first processing means and first data set such that the user is warned at the point of transaction that the related transaction being entered will result in an overdraft of fee penalty condition based on balance and effective date information in the first data set with said warning occurring before the transaction is completed thus before the damage is done.

10. A system as claimed in claim 1, further comprising:
calendar means for keeping up with the date and clock means for keeping up with the time, data entry error prevention means operatively connected to first processing means for accessing calendar means and clock means and first data set such that the user is warned before the transaction is completed that the related transaction being entered has an error including the wrong calendar date, the wrong business day date or the wrong check number.

11. A system as claimed in claim 1, further comprising:
transaction synchronization means operatively connected to the first and second data sets, which contain time stamped data, and comparison means to facilitate the reconcilement of on line transactions, bill payment and electronic cash register charges by making use of time and date matching.

12. A system for processing checking account data stored in a host computer, said system comprising:
a first memory means for storing a first data set;
a substantially real time, electronic transmission means for transmitting said first data set in substantially real time;
a processing device operably connected with said host computer and said substantially real time transmission means, said processing device having comparison means for electronically comparing said checking account data with said first data set transmitted in substantially real time by said transmission means;
electronic and automatic discrepancy identification means responsive to said comparison means for electronically and automatically identifying discrepancies between datum of said checking account data and datum of said first data set transmitted by said transmission means;

electronic and automatic editing means operably connected with said first memory means, said electronic and automatic editing means being responsive to said electronic and automatic discrepancy identification means for electronically and automatically revising said first data set transmitted by said transmission means to conform with said checking account data;

electronic validation means operatively connected to comparison means and transmission means for giving the user an authorized validation message when the account is reconciled.

13. A system as claimed in claim 12, further comprising:

display means for displaying said datum for which discrepancies were identified by said electronic and automatic discrepancy identification means.

14. A system for evaluating a first and a second set of individual bank account transaction data, said system comprising:

a first bank account processing means for processing said first set of individual bank account transaction data;

a substantially real time bidirectional transmitting means for transmitting, in substantially real time, bank account data to and from said first and second bank account processing means;

a second processing means having receiving means operable for receiving said first set of individual bank account transaction data transmitted by said transmitting means;

a second bank account processing means for processing said second set of individual bank account transaction data;

a comparing means, operatively connected to said transmitting means, said comparing means for electronically comparing individual bank account transaction data of said first set with individual bank account transaction data of said second set;

discrepancy identification means, responsive to said comparing means for identifying discrepancies between individual bank account transaction data of said first set and individual bank account transaction data of said second set;

electronic validation means operatively connected to comparing means and transmitting means for giving the user an authorized validation message when the account is reconciled; and transaction identification means, for identifying the individual bank account transaction data between which said discrepancy identification means identified a discrepancy.

15. A system as claimed in claim 14, further comprising:

error identification means, disposed for identifying the type of discrepancy identified by said discrepancy identification means.

16. A system as claimed in claim 14, further comprising:

display means for displaying the individual bank account transaction data identified by said transaction identification means.

17. A system as claimed in claim 14, further comprising:

automatic reconciliation means for automatically revising said second set of individual bank account transaction data to conform with said first set of individual bank account transaction data.

18. A system for operating a first memory means which stores a first checking account transaction data set, a second memory means which stores a second checking account transaction data set, and an electronic and automatic comparing means, operatively connected with the first and second memory means said system comprising the steps of:

communicating, in substantially real time, said first and second checking account transaction data sets from the first and second memory means to the electronic and automatic comparing means;

electronically and automatically comparing said first and second transaction data sets in said electronic and automatic comparing means;

electronically and automatically identifying discrepancies between said first and second checking account transaction data sets upon electronically and automatically comparing said first and second checking account transaction data sets;

displaying said identified discrepancies on a display means;

electronically and automatically revising said first checking account transaction data set to correspond with said second checking account transaction data set;

communicating said revised first checking account transaction data set to said first memory means; and storing said revised first checking account transaction data set in said first memory means;

electronically validating the accuracy of the reconciliation by sending an authorized validation message to the user to be displayed on a display means.

19. A device for monitoring and processing checking account transactions, comprising:

first processing means for storing a first set of data corresponding to checking account information;

second processing means for storing a second set of data corresponding to said checking account transaction information;

first communication means for electronically communicating said first set of data, from said first processing means to said second processing means in substantially real time;

comparison means operatively connected to receive said first set of data and said second set of data for electronically comparing said first set of data and said second set of data;

electronic and automatic discrepancy identification means responsive to said comparison means for electronically and automatically identifying discrepancies between said first set of data and said second set of data;

second communication means for communicating data, including said identified discrepancies, from said discrepancy identification means to said first processing means;

electronic and automatic display means associated with said first processing means for electronically and automatically displaying said identified discrepancies; and electronic and automatic editing means associated with said first processing means for electronically and automatically revising said first set of data to conform to said second set of data, wherein the second data set is daily or continuously updated; and pre-reconciliation user paper check writing error sensing means associated with second processing means and pre-reconciliation first data set data entry error sensing means associated with the second processing means operatively connected to the second data set and the first data set updated at last reconciliation for sensing problems caused by check writing errors and first data set data entry errors even though those errors have not yet resulted in additional fees, fines or other adverse consequences to the user and even if the user is not in contact with the bank, and for generating a warning condition if a future problem is sensed;

pre-reconciliation future overdraft sensing means at host operatively connected to the daily or continuously updated second data set and first data set as updated at last reconciliation for detecting many overdraft conditions before they occur;

pre-reconciliation warning communication means for notifying a user of the system of a warning condition.

20. A device for monitoring and processing checking account transactions, comprising:

first processing means for storing a first set of data corresponding to checking account information;

second processing means for storing a second set of data corresponding to said checking account transaction information;

first communication means for electronically communicating said first set of data, from said first processing means to said second processing means in substantially real time;

comparison means operatively connected to receive said first set of data and said second set of data for electronically comparing said first set of data and said second set of data;

electronic and automatic discrepancy identification means responsive to said comparison means for electronically and automatically identifying discrepancies between said first set of data and said second set of data;

second communication means for communicating data, including said identified discrepancies from said discrepancy identification means to said first processing means;

electronic and automatic display means associated with said first processing means electronically and automatically displaying said identified discrepancies; and electronic and automatic editing means associated with said first processing means for electronically and automatically revising said first set of data to conform to said second set of data; and calendar means for keeping up with the data, clock means for keeping up with the time and float projection means operatively connected to first data set and calendar means for calculating an estimated real balance at the bank based upon typical transaction clearing delays.

* * * * *